United States Patent
Osanai et al.

(10) Patent No.: US 10,356,294 B2
(45) Date of Patent: Jul. 16, 2019

(54) PHOTOGRAPHING DEVICE, MOVING BODY FOR PHOTOGRAPHING, AND PHOTOGRAPHING CONTROL APPARATUS FOR MOVING BODY

(71) Applicant: OLYMPUS CORPORATION, Tokyo (JP)

(72) Inventors: Yoji Osanai, Hachioji (JP); Tsutomu Igarashi, Tokyo (JP); Taichiro Kouchi, Hino (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 134 days.

(21) Appl. No.: 15/457,268

(22) Filed: Mar. 13, 2017

(65) Prior Publication Data
US 2018/0227469 A1 Aug. 9, 2018

(30) Foreign Application Priority Data
Mar. 23, 2016 (JP) ................................. 2016-058814

(51) Int. Cl.
| | |
|---|---|
| *H04N 5/232* | (2006.01) |
| *H04N 5/225* | (2006.01) |
| *G02B 27/64* | (2006.01) |
| *B64C 39/02* | (2006.01) |
| *B64D 47/08* | (2006.01) |

(52) U.S. Cl.
CPC ......... *H04N 5/2254* (2013.01); *B64C 39/024* (2013.01); *G02B 27/644* (2013.01); *H04N 5/2252* (2013.01); *H04N 5/232* (2013.01); *B64C 2201/127* (2013.01); *B64C 2201/141* (2013.01); *B64D 47/08* (2013.01)

(58) Field of Classification Search
CPC ............ B64C 2201/127; B64C 39/024; B64C 2201/027; B64D 47/08; G03B 15/006; G03B 17/561; G02B 27/644; G02B 27/646; G05D 1/0094; H04N 5/2254; H04N 7/183; H04N 5/2328; G01C 21/18; G01C 25/00; G01M 1/12; G01M 1/36
See application file for complete search history.

(56) References Cited

U.S. PATENT DOCUMENTS

| | | | | |
|---|---|---|---|---|
| 8,184,965 B2* | 5/2012 | Hayashi | ............... | G02B 27/646 |
| | | | | 396/55 |
| 8,798,450 B2* | 8/2014 | Aicher | ................... | G01C 21/18 |
| | | | | 248/184.1 |

(Continued)

*Primary Examiner* — Chia Wei A Chen
(74) *Attorney, Agent, or Firm* — Scully, Scott, Murphy & Presser, P.C.

(57) ABSTRACT

A photographing device attachable to a moving body includes: a first control section configured to predict and obtain a change in physical quantity based on an alteration in a photographing state; and a communication control section configured to transmit information related to the change in the physical quantity. The photographing device improves stability in the moving body and stability of photographing. Information related to influence on the moving body based on a change in an outer shape and a change in a position of the center of gravity of the photographing device mounted on the moving body is shared by the moving body to improve the stability in the moving body and the stability of photographing.

7 Claims, 18 Drawing Sheets

(56) References Cited

U.S. PATENT DOCUMENTS

| | | | |
|---|---|---|---|
| 8,801,302 B2* | 8/2014 | Orf | G03B 17/561 |
| | | | 396/421 |
| 9,957,048 B2* | 5/2018 | Gil | H04W 4/70 |
| D819,541 S * | 6/2018 | Chen | D12/327 |
| 2014/0016922 A1* | 1/2014 | Greenthal | F16M 11/00 |
| | | | 396/419 |
| 2014/0037278 A1* | 2/2014 | Wang | F16M 11/10 |
| | | | 396/55 |
| 2015/0370250 A1* | 12/2015 | Bachrach | G05D 1/0016 |
| | | | 701/2 |
| 2016/0014309 A1 | 1/2016 | Ellison et al. | |
| 2016/0039541 A1* | 2/2016 | Beardsley | G05D 1/0088 |
| | | | 701/2 |
| 2016/0171330 A1* | 6/2016 | Mentese | G06K 9/3233 |
| | | | 348/170 |
| 2016/0286143 A1* | 9/2016 | Ohtsuka | H04N 5/23209 |
| 2016/0301845 A1* | 10/2016 | Bell | H04N 5/2328 |
| 2016/0327950 A1* | 11/2016 | Bachrach | G05D 1/0016 |
| 2016/0330436 A1* | 11/2016 | Jarok | H04N 17/002 |
| 2017/0006228 A1* | 1/2017 | Takayanagi | H04N 5/23293 |
| 2017/0068858 A1* | 3/2017 | Winter | H04N 7/188 |
| 2017/0069214 A1* | 3/2017 | Dupray | G08G 5/0021 |
| 2017/0094185 A1* | 3/2017 | Wang | G03B 17/561 |
| 2017/0106976 A1* | 4/2017 | Kuhara | B64C 39/024 |
| 2017/0163896 A1* | 6/2017 | Kang | H04N 5/23287 |
| 2017/0227162 A1* | 8/2017 | Saika | F16M 13/02 |
| 2017/0269604 A1* | 9/2017 | Shiromizu | A01D 34/008 |
| 2018/0017791 A1* | 1/2018 | Beckman | G02B 27/01 |
| 2018/0296865 A1* | 10/2018 | Detweiler | B64D 1/02 |

* cited by examiner

PHOTOGRAPHING DEVICE, MOVING BODY FOR PHOTOGRAPHING, AND PHOTOGRAPHING CONTROL APPARATUS FOR MOVING BODY

CROSS REFERENCE TO RELATED APPLICATION

This application claim is benefit of Japanese Application No. 2016-058814 filed in Japan on Mar. 23, 2016, the contents of which are incorporated by this reference.

BACKGROUND OF THE INVENTION

1. Field of the Invention

The present invention relates to a photographing device, a moving body for photographing, and a photographing control apparatus for moving body suitable for a remote-handling or autonomous flying object such as a drone.

2. Description of the Related Art

In recent years, an unmanned aircraft, such as a drone, that flies in a remotely handled or autonomous manner has been commercialized. For example, a relatively small unmanned aircraft is utilized due to an advantage that information can be safely and efficiently acquired in a dangerous area that is hard for a manned aircraft to reach, an accident site or a disaster area in which observation at relatively low altitude is required, and the like. A camera is built in the drone or the like to attain the object.

However, a relatively small lens or image pickup device is often used in the built-in camera, and a picked-up image with sufficiently satisfactory image quality may not be obtained. Therefore, a photographing device with high functionality and high performance may be adopted and attached to the unmanned aircraft. Particularly, a camera that can be equipped with a high-performance lens having a zoom function, an autofocus function, and the like can be adopted to easily obtain an image with image quality desired by a user.

Note that a gimbal system that can accurately support a photographing device on a moving body, such as an aircraft, is disclosed in the specification of U.S. Patent Application Publication No. 2016/0014309.

SUMMARY OF THE INVENTION

An aspect of the present invention provides a photographing device attachable to a moving body, the photographing device including: a first control section configured to predict and obtain a change in physical quantity based on an alteration in a photographing state; and a communication control section configured to transmit information related to the change in the physical quantity.

An aspect of the present invention provides a moving body for photographing to which a photographing device is attached, the moving body for photographing including: a communication control section configured to receive a change in physical quantity related to the photographing device generated based on an alteration in a photographing state of the photographing device; a second control section configured to generate information based on the change in the physical quantity or based on a moment generated according to the change in the physical quantity; and a propulsive force control section configured to control propulsive force based on the information generated by the second control section.

An aspect of the present invention provides a photographing control apparatus for moving body including: a first control section configured to obtain a change in physical quantity related to a photographing device attached to a moving body based on a photographing state alteration operation of the photographing device; and a second control section configured to predict and obtain the change in the physical quantity or a moment to be generated in the moving body according to the change in the physical quantity and generate information based on the obtained change in the physical quantity or the obtained moment.

The above and other objects, features and advantages of the invention will become more clearly understood from the following description referring to the accompanying drawings.

BRIEF DESCRIPTION OF THE DRAWINGS

FIG. 4 is a cross-sectional view of lens showing an example of a configuration of respective lenses in an optical system 11a;

DETAILED DESCRIPTION OF THE PREFERRED EMBODIMENTS

Hereinafter, embodiments of the present invention will be described in detail with reference to the drawings.

First Embodiment

Figure 1A:
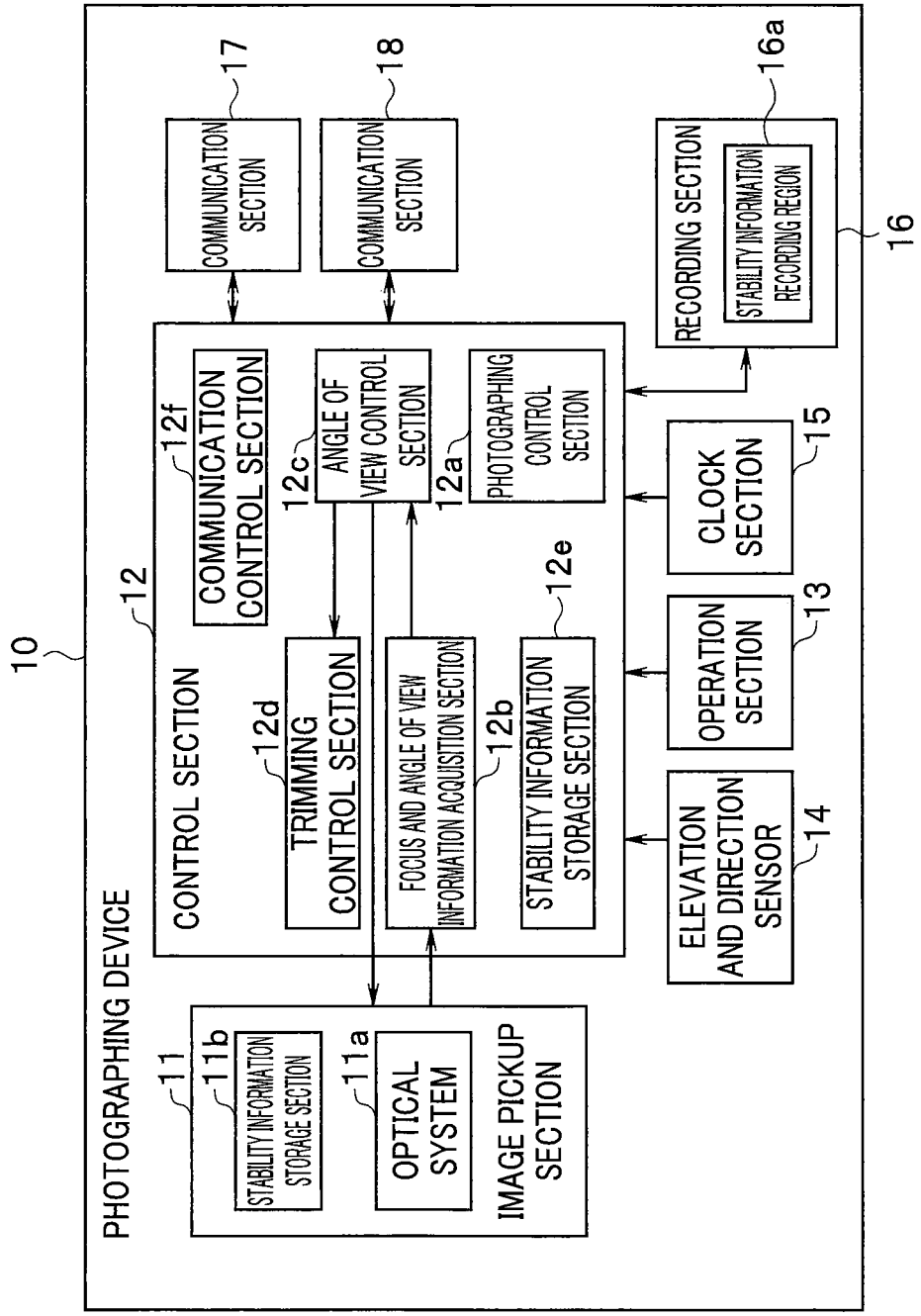
FIG. 1A is a block diagram showing a photographing device according to a first embodiment of the present invention, the photographing device configuring part of a photographing control apparatus for moving body.
Figure 1B:
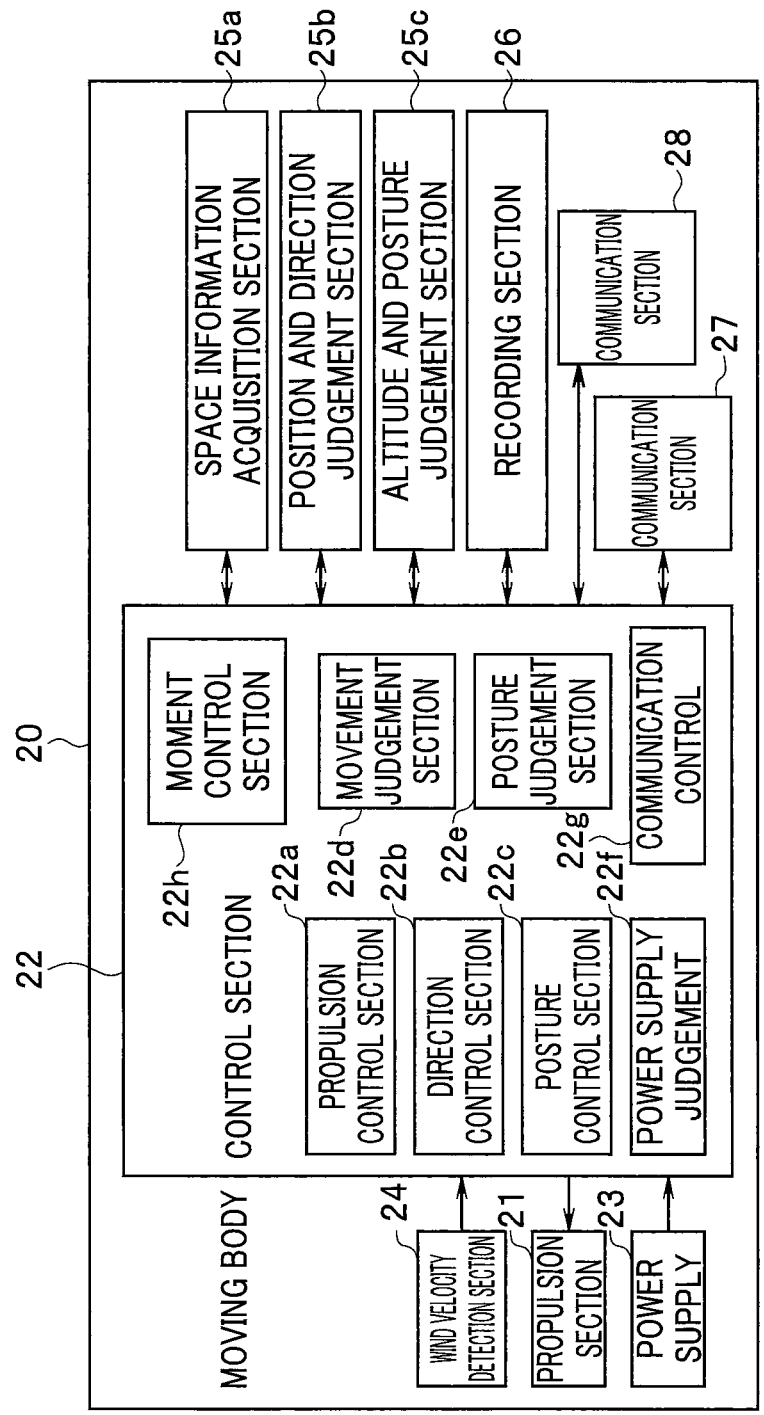
FIG. 1B is a block diagram showing a moving body for photographing according to the first embodiment, the moving body configuring part of the photographing control apparatus for moving body.
Figure 2A:
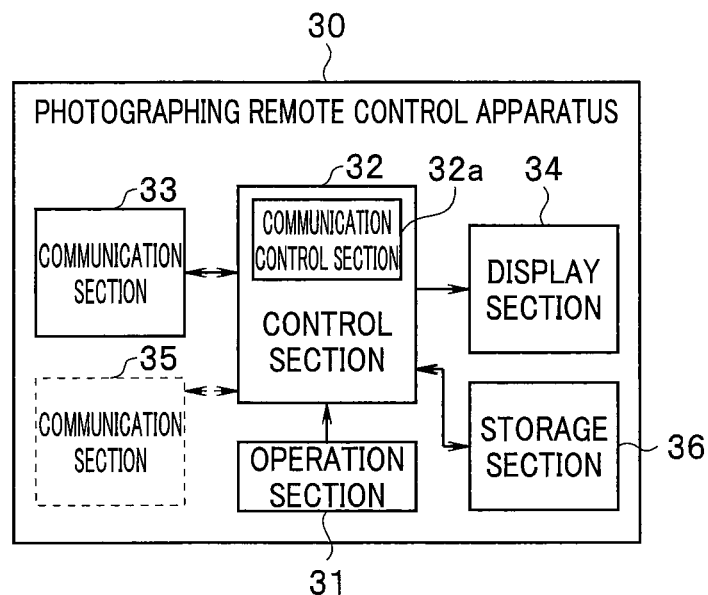
FIG. 2A is a block diagram showing a photographing remote control apparatus of the photographing device of FIG. 1A.
Figure 2B:
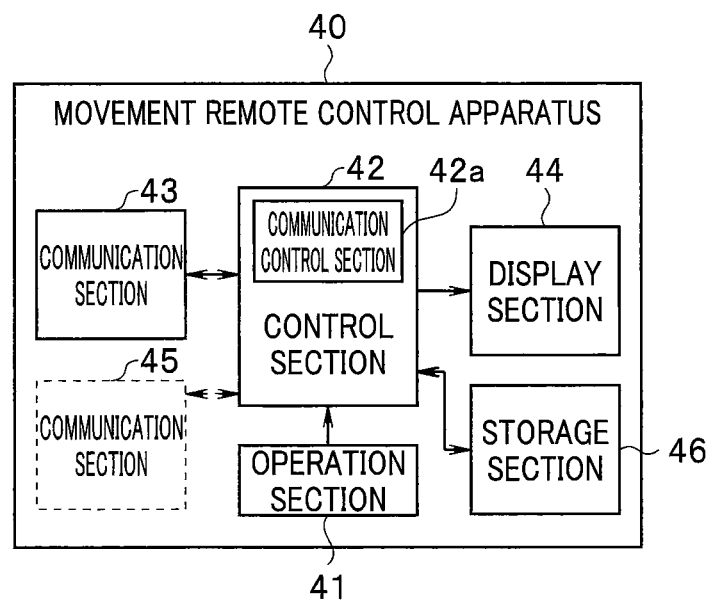
FIG. 2B is a block diagram showing a movement remote control apparatus of the moving body of FIG. 1B.

FIG. 1A is a block diagram showing a photographing device according to a first embodiment of the present invention, the photographing device configuring part of a photographing control apparatus for moving body. FIG. 1B is a block diagram showing a moving body for photographing according to the first embodiment, the moving body configuring part of the photographing control apparatus for moving body. FIG. 2A is a block diagram showing a photographing remote control apparatus of the photographing device of FIG. 1A. FIG. 2B is a block diagram showing a movement remote control apparatus of the moving body of FIG. 1B.

The moving body may be, for example, an unmanned aircraft, such as a drone, or may be a radio control vehicle or a radio control ship. The moving body is a remote-handling or autonomous unmanned moving object. In the present embodiment, the photographing device configuring the photographing control apparatus for moving body obtains, as a change in the physical quantity, a movement of the center of gravity or a change in the shape of the photographing device which affects the movement and the posture of the moving body, and transmits the change in the physical quantity toward the moving body. In the moving body, the change in the physical quantity can be used to control the movement and the posture of the moving body to improve the stability of the moving body. The movement of the center of gravity or the change in the shape of the photographing device is permitted and controlled while the stability of the moving body is ensured, and this allows securing photographing while stabilizing the moving body.

Figure 3:
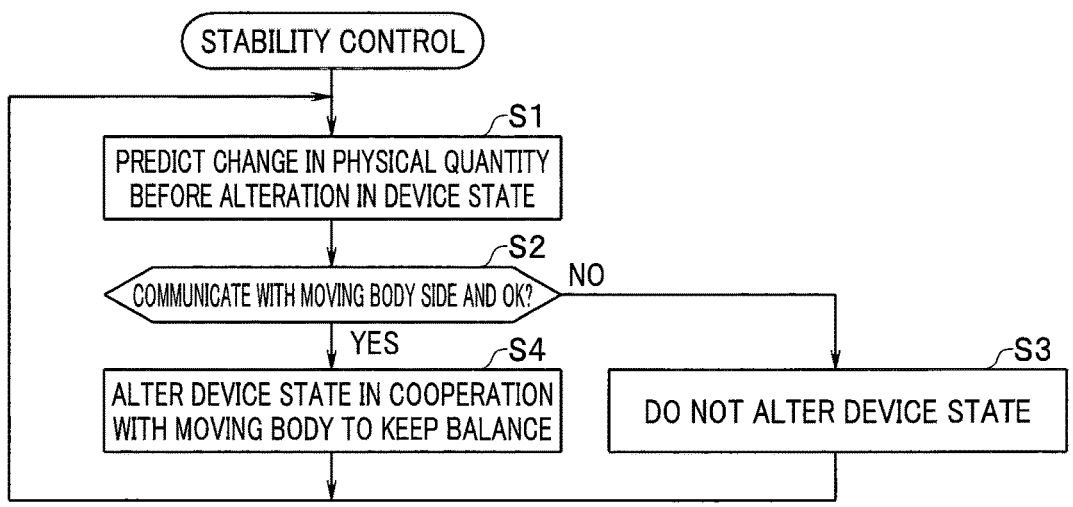
FIG. 3 is a flowchart showing stability control by the photographing device of the present embodiment.

FIG. 3 is a flowchart showing the stability control by the photographing device of the present embodiment.

In step S1, the photographing device predicts the change in the physical quantity based on an alteration in the device state (photographing state) before the alteration of the device state. For example, a movement of a zoom lens or a focus lens of the photographing device changes the position of the center of gravity of the photographing device. When, for example, a stroboscope part built in the photographing device pops up, and the shape of the photographing device is changed, the change in the shape of the stroboscope part changes the wind resistance. When a photographing state alteration operation is done, such as the lens movement and the pop-up of the stroboscope part, the photographing device predicts, as an amount of change in the physical quantity, the change in the position of the center of gravity or the change in the wind resistance based on the alteration in the device state (photographing state), prior to the alteration in the device state.

In step S2, the photographing device communicates with the moving body to transmit the change in the physical quantity to the moving body and obtains an answer for whether the change in the physical quantity can be allowed in the moving body. If an answer of not allowing the change is obtained from the moving body, the photographing device does not permit the alteration in the device state in step S3. For example, even if the user performs a zoom operation, the operation is not performed.

On the other hand, if the photographing device obtains an answer of allowing the change from the moving body in step S2, the photographing device alters the device state in cooperation with the moving body in step S4. That is, the moving body allows the change in the physical quantity of the photographing device while setting a condition necessary for maintaining the stability of the moving body. The photographing device alters the device state for changing the physical quantity while following the condition designated by the moving body.

In this way, the photographing device predicts in advance the change in the physical quantity that affects the service of the moving body and transmits the information to the moving body in the present embodiment. The photographing device and the moving body provided with the photographing device perform the control in cooperation to ensure the stability of the moving body even when the state of the photographing device is altered. The state of the photographing device can be altered while the stability of the moving body is maintained, and the stability of photographing is ensured even when the state of the photographing device is altered.

Note that although most of the configuration of the photographing control apparatus for moving body is provided in the photographing device in the example illustrated in the present embodiment, the photographing control apparatus for moving body may be provided in a photographing remote control apparatus configured to remotely control the photographing device or may be provided in the moving body such as a drone. The photographing control apparatus for moving body may be provided in a movement remote control apparatus configured to remotely control the moving body or may be dispersed and provided in the apparatuses. The photographing control apparatus for moving body may be provided in an apparatus other than the apparatuses.

In FIG. 1A, an attachment member not shown can attach a photographing device 10 to a moving body 20 of FIG. 1B. The photographing device 10 includes an image pickup section 11. The image pickup section 11 is provided with an image pickup device not shown configured by a CCD or CMOS sensor or the like, and an optical system 11a leads an object optical image to an image pickup surface of the image pickup device. A photographing control section 12a of a control section 12 is configured to control a mechanical section not shown of the optical system to drive and control a focus lens, a zoom lens, and a diaphragm configured in the optical system 11a. The image pickup device photoelectrically converts the object optical image to obtain a picked-up image. Note that the control section 12 may be configured by a processor, such as a CPU, not shown and may be configured to realize each function according to programs stored in a memory not shown.

In the present embodiment, a stability information storage section 11b configured to hold information related to the optical system 11a is provided in the image pickup section 11. Note that although the optical system 11a is provided in the image pickup section 11 in the example illustrated in FIG. 1, an interchangeable lens attachable to and detachable from a housing of the photographing device 10 may be adopted as an optical system, and an object optical image from the interchangeable lens may be formed on the image pickup surface of the image pickup device.

Figure 4:
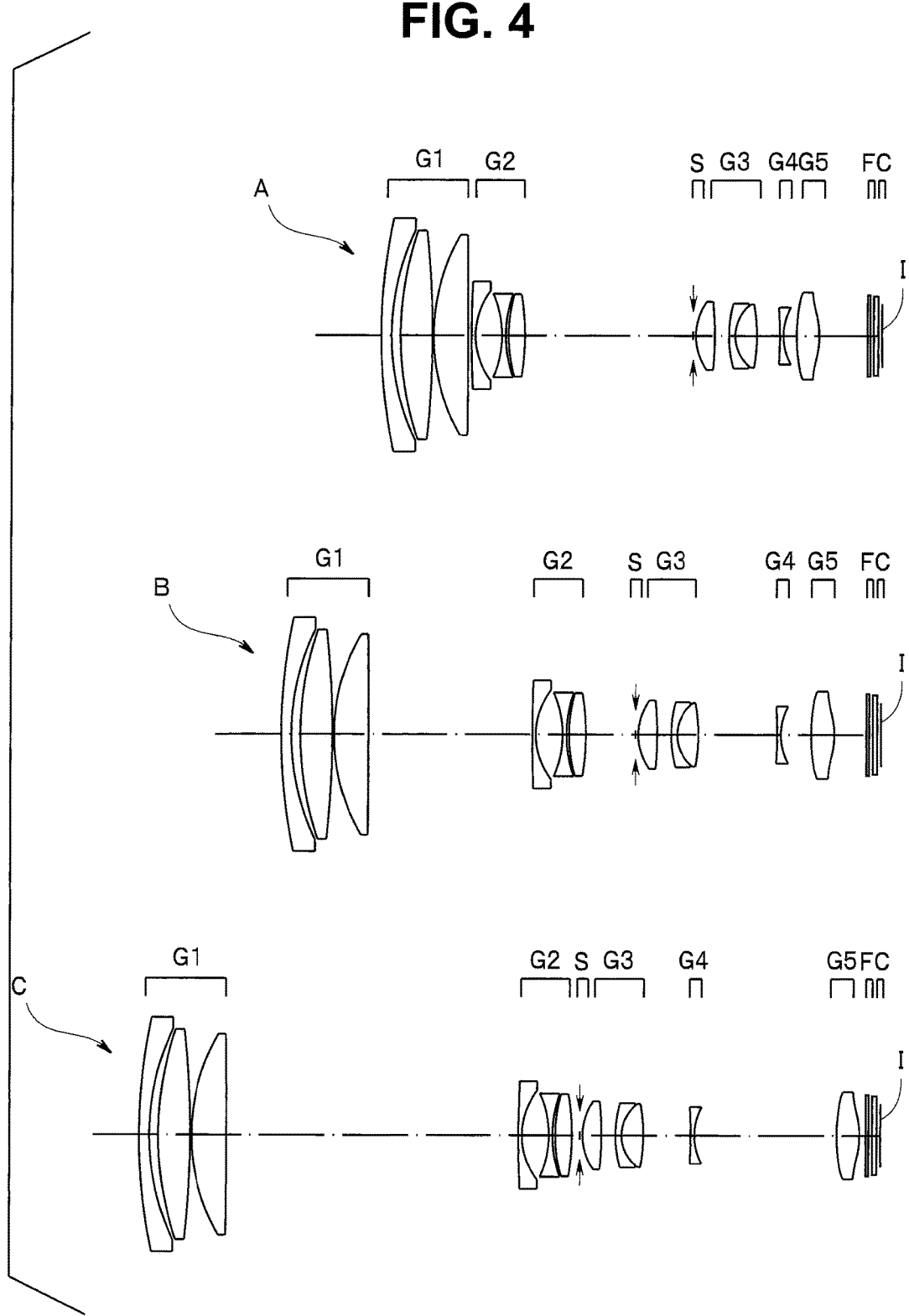

FIG. 4 is a cross-sectional view of lens showing an example of a configuration of respective lenses in the optical system 11a. An upper row of FIG. 4 shows a wide-angle end state A in which an infinite object point is focused. A middle row shows an intermediate state B, and a lower row shows a telephoto end state C.

In the example of FIG. 4, the optical system includes, in order from the object side, a first lens group G1 with positive refractive power, a second lens group G2 with negative refractive power, an aperture diaphragm S, a third lens group G3 with positive refractive power, a fourth lens group G4 with negative refractive power, and a fifth lens group G5 with positive refractive power. In FIG. 4, F represents a parallel plate configuring a low-pass filter provided with a wavelength band restriction coat for restricting infrared light, C represents a parallel plate of a cover glass of an electronic image pickup device, and I represents an image plane. Note that a multilayer film for restricting the wavelength band may be applied on the surface of the cover glass C. The cover glass C may have a low-pass filter function.

With the lens configuration, the first lens group G1 moves toward the object side during zooming from the wide-angle end to the telephoto end. The second lens group G2 moves toward the image side. The third lens group G3 moves toward the object side. The fourth lens group G4 moves toward the object side. The fifth lens group G5 moves toward the object side and then moves toward the image side. Therefore, as for intervals among the lens groups, the interval between the first lens group G1 and the second lens group G2 increases, the interval between the second lens group G2 and the third lens group G3 decreases, the interval between the third lens group G3 and the fourth lens group G4 changes, and the interval between the fourth lens group G4 and the fifth lens group G5 increases. The aperture diaphragm S moves integrally with the third lens group G3.

It is desirable that one of the fifth lens group and the fourth lens group performs focusing for adjusting the focus. When the focusing is performed by the group, the load imposed on a motor is small, because the lens weight is light. The focusing may be performed by another lens group. A plurality of lens groups may be moved to perform the focusing. The entire lens system may be drawn out to perform the focusing, or part of the lenses may be drawn out or drawn in to perform the focusing.

In FIG. 1A, an operation section 13 outputs an operation signal based on a user operation to the control section 12. The photographing control section 12a in the control section 12 can generate a focus signal and a zoom signal based on the operation signal from the operation section 13 to drive the respective lenses of the optical system 11a.

The focus control and the zoom control by the photographing control section 12a drive the respective lenses of the optical system 11a to perform focusing and zooming. A focus and angle of view information acquisition section 12b acquires information related to the focal position and the zoom position and information related to the angle of view in photographing from the image pickup section 11 and outputs the information to an angle of view control section 12c. The angle of view control section 12c is controlled by the photographing control section 12a to control a trimming control section 12d to perform electronic zooming by trimming when the zooming exceeds a range of optical zooming by the optical system 11a.

For example, as shown in FIG. 4, the optical system 11a is configured by a plurality of lens groups disposed in an optical axis direction. The optical system 11a is disposed in a lens barrel not shown attached to a front surface of the housing of the photographing device 10. Note that the interchangeable lens includes the lens barrel. In the zoom from the wide-angle end side to the telephoto end, the distance from a distal end to a proximal end of the lens group changes as shown in FIG. 4, and the disposed position of each lens group on the optical axis changes. Note that the lens barrel also expands and contracts in some cases according to the zooming. The movement and the expansion and contraction of the lens groups and the lens barrel change the position of the center of gravity of the entire photographing device 10.

A moment is generated in the moving body 20 according to the position of the center of gravity of the moving body 20, such as a drone, the position of the center of gravity of the entire photographing device 10, the weight of the photographing device 10, and the attachment position of the photographing device 10 on the moving body 20. It is assumed that the moment acting on the moving body 20 is 0 when the lens barrel of the optical system 11a is in a predetermined expansion and contraction state. When the expansion and contraction state of the lens barrel is changed by the zoom operation, the moment according to the amount of change and the moved weight acts on the moving body 20. The magnitude of the moment can be obtained by calculation or experiment based on the weight of the components and the designed amount of movement if the position of the center of gravity of the moving body 20, the position of the center of gravity of the entire photographing device 10, the weight of the photographing device 10, and the attachment position of the photographing device 10 on the moving body 20 are already known.

When the moment (hereinafter, also called a photographing device moment) is about to act on the moving body due to the zoom operation or the like of the photographing device 10, whether propulsive force or the like necessary for cancelling the photographing device moment can be generated in the moving body is judged, and both the photographing device 10 and the moving body 20 are controlled to perform the zoom operation of the photographing device 10 in a range of the propulsive force that can be generated.

Information of the weight and the position of the center of gravity of the entire photographing device 10 for obtaining the photographing device moment (hereinafter, called photographing device side moment calculation information) is stored in a stability information storage section 12e of the photographing device 10 according to the zoom position. Note that the information of the position of the center of gravity of the photographing device 10 may be indicated by, for example, the distance in the horizontal and vertical directions with respect to the position of the center of gravity of the moving body 20 or may be indicated by the distance in the horizontal and vertical directions with respect to the attachment position. It is only necessary that the information can express the positional relationship relative to an already-known position on the moving body 20.

The photographing device 10 includes a communication section 17, and a communication control section 12f in the control section 12 controls the communication section 17 to enable transmitting and receiving information to and from a communication section 27 of the moving body 20 described later. When the zoom operation is performed, the control section 12 as a first control section is configured to read the photographing device side moment calculation information according to the zoom position to transmit the photographing device side moment calculation information from the communication section 17 to the communication section 27 of the moving body 20.

In the present embodiment, the moving body 20 can transmit device state alteration control information including zoom control information for zoom control and the like to the control section 12 of the photographing device 10 through the communication sections 27 and 17 as described later. When the zoom control information is transmitted from the moving body 20, the photographing control section 12a can control the zoom of the optical system 11a based on the zoom control information.

Note that although the case in which the position of the center of gravity of the photographing device 10 is changed is described, the moment (photographing device moment) is also generated in the moving body 20 due to wind resistance associated with the change in the shape caused by the pop-up or the like of the stroboscope part. The stability information storage section 12e stores photographing device side moment calculation information that is information of the change in the wind resistance corresponding to the change in the shape of the stroboscope part, and the control section 12 can transmit all the photographing device side moment calculation information associated with the change in the center of gravity and the change in the shape of the photographing device 10 to the moving body 20.

For example, when the device state alteration control information for controlling the pop-up of the stroboscope part is transmitted from the moving body 20, the control section 12 may be able to control the pop-up of the stroboscope part based on the information.

As described above, the interchangeable lens can also be adopted as the optical system 11a. In this case, it may be better to store the photographing device side moment calculation information in the interchangeable lens. In consideration of the case, FIG. 1 illustrates an example in which the image pickup section 11 is provided with the stability information storage section 11b configured to store the photographing device side moment calculation information. When the zoom operation is performed, the control section 12 may be configured to transmit the photographing device side moment calculation information stored in the stability information storage section 11b of the image pickup section 11 to the moving body 20 through the communication section 17.

The picked-up image from the image pickup section 11 is given to the control section 12, and the control section 12 can apply predetermined image signal processing, such as color adjustment processing, matrix conversion processing, noise removal processing, and various other types of signal processing, and give and record the picked-up image in a recording section 16. The recording section 16 can be, for example, an IC memory. Note that the photographing device side moment calculation information may be recorded in a stability information recording region of the recording section 16. The control section 12 can also transfer the picked-up image to a photographing remote control apparatus 30 through a communication section 18.

The photographing device 10 is also provided with an elevation and direction sensor 14. The elevation and direction sensor 14 is configured to detect the posture of the photographing device 10 and output a detection result to the control section 12. The control section 12 can judge the photographing direction of the image pickup section 11 based on the detection result of the elevation and direction sensor 14. Note that the control section 12 may also be configured to transmit information related to the photographing direction of the image pickup section 11 to the moving body 20 through the communication section 17.

The photographing device is also provided with a clock section 15. The clock section 15 generates time information and outputs the time information to the control section 12. When, for example, the amount of control per unit time period is designated by the device state alteration control information, the control section 12 is configured to use the time information from the clock section 15 to control each section. The control section 12 may also be configured to synchronize the time information of the clock section 15 with the time information used in the moving body 20 for the cooperative control between the photographing device 10 and the moving body 20.

Note that in the description above, the photographing device 10 stores the photographing device side moment calculation information and outputs information according to the zoom position or the like to the moving body 20. However, if, for example, the position of the center of gravity and the attachment position of the moving body 20 are already known, the photographing device 10 may take the information into account to store the information for calculating the photographing device moment or the value of the photographing device moment and transmit the information to the moving body 20 according to the zoom position or the like. When the moving body 20 side stores not only the information of the position of the center of gravity and the attachment position of the moving body 20, but also the information of the weight and the position of the center of gravity at each zoom position of the photographing device 10, the photographing device 10 may transmit the zoom information related to the zoom position to the moving body 20, for example. A storage section configured to store the photographing device moment at each zoom position may be provided in the moving body 20, and the photographing device moment according to the zoom information from the photographing device 10 may be read from the storage section.

In FIG. 1B, the moving body 20 includes a control section 22. The control section 22 may be configured by a processor, such as a CPU, not shown or may be configured to realize each function according to a program stored in a memory not shown. The moving body 20 is provided with a propulsion section 21 and a power supply 23. The power supply is configured by, for example, a battery and is configured to supply electric power to each section of the moving body 20. The propulsion section 21 generates propulsive force for moving the moving body 20. Note that while the propulsive force needs to be generated during hovering when the moving body 20 is a drone that moves in the air, the propulsive force may be unnecessary during gliding when the moving body 20 is an airplane or the like.

When the moving body 20 is a drone, a plurality of propulsion sections 21 are provided on an end portion of an arm not shown, and the control section 22 is provided at the top center of the arm, for example. Each propulsion section 21 is configured by, for example, a motor and a propeller rotated and driven by each motor. Note that in this case, the respective motors configuring the respective propulsion sections 21 are controlled independently from each other to allow the moving body 20 to move in predetermined posture and speed. An attachment member is attached to the bottom center of the arm, and the photographing device 10 of FIG. 1A is attached.

The control section 22 is provided with a propulsion control section 22a, and the propulsion control section 22a can independently control the propulsive force of the plurality of propulsion sections 21. The control section 22 is provided with a direction control section 22b and a posture control section 22c. The direction control section 22b and the posture control section 22c respectively output control signals for controlling the movement direction of the moving body 20 and the posture of the moving body 20 to the propulsion control section 22a.

A movement judgement section 22d judges the movement direction of the moving body 20 and outputs a judgement result to the direction control section 22b. A posture judgement section 22e judges the posture of the moving body 20 and outputs a judgement result to the posture control section 22c. To control the movement direction of the moving body 20 to a designated direction, the direction control section 22b controls the propulsion control section 22a such that the movement judgement result coincides with the designated movement direction. The posture control section 22c controls the propulsion control section 22a such that the posture judgement result coincides with a designated posture.

Various types sensor information is given to the control section 22 to judge the movement direction and the posture of the moving body 20. In the example of FIG. 1B, the moving body 20 is provided with a space information acquisition section 25a, a position and direction judgement section 25b, and an altitude and posture judgement section 25c. The space information acquisition section 25a can be configured by, for example, a radar or a camera, and is configured to acquire space information, such as ground speed. The position and direction judgement section 25b can be configured by, for example, a GPS (global positioning system) receiver and is configured to acquire the position and direction information of the moving body 20. The altitude and posture judgement section 25c can be configured by, for example, a barometric pressure sensor, an acceleration sensor, or a gyroscope and is configured to judge the altitude and the posture of the moving body 20. Judgement results of the judgement sections 25a to 25c are given to the movement judgement section 22d and the posture judgement section 22e, and the movement judgement section 22d and the posture judgement section 22e are configured to judge the movement direction and the posture of the moving body 20 based on the judgement results.

Note that the moving body 20 is provided with a wind velocity detection section 24. The wind velocity detection section 24 detects the wind velocity relative to the moving body 20 and outputs the wind velocity to the control section 22. The control section 22 can use the detection result of the wind velocity for the direction judgement and the posture judgement and can also use the detection result of the wind velocity for the propulsion control.

Note that the control section 22 is provided with a power supply judgement section 22f. The power supply judgement section 22f judges the remaining battery of the power supply 23. If the remaining battery is equal to or smaller than a predetermined threshold, the control section 22 performs control for stopping the movement or for the movement to a predetermined position. For example, when the moving body 20 is a drone, the moving body 20 is controlled to return to a predetermined base station once the remaining battery becomes smaller than the predetermined threshold in order to prevent a crash.

The moving body 20 is also provided with a recording section 26. Information of a movement path of the moving body 20 can be recorded in the recording section 26. The recording section 26 stores information necessary for calculating the photographing device moment such as information related to the position of the center of gravity of the moving body 20 and the attachment position of the photographing device 10 on the moving body 20 (hereinafter, called moving body side moment calculation information). The recording section 26 may also be configured to record image information transmitted from the photographing device 10 through the communication section 27. The moving body is also provided with a communication section 28. The communication section 28 can communicate with a communication section 43 of a movement remote control apparatus 40 described later.

The moving body 20 is provided with the communication section 27. The communication section 27 can transmit and receive information to and from the communication section 17 of the photographing device 10. A communication control section 22g is configured to control the communication section 27 to receive the photographing device side moment calculation information from the photographing device 10 and transmit an availability response, an unavailability response, and device state alteration control information from a moment control section 22h to the communication section 17 of the photographing device 10.

When the photographing device side moment calculation information is received from the photographing device 10, the moment control section 22h of the control section 22 calculates the photographing device moment based on the center of gravity information of the moving body 20 and the attachment position information of the photographing device 10. Note that the photographing device side moment calculation information and the photographing device moment obtained based on the center of gravity information of the moving body 20 and the attachment position information of the photographing device 10 may be stored in a storage section not shown, and the photographing device moment corresponding to the photographing device side moment calculation information may be read. The moment control section 22h is configured to calculate propulsive force necessary to generate the moment for canceling out the photographing device moment, that is, propulsive force for ensuring the stability (hereinafter, called stable propulsive force and generate control information for controlling the propulsion control section 22a, the direction control section 22b, and the posture control section 22c to obtain the stable propulsive force.

Note that the stable propulsive force may not have propulsive force necessary to generate the moment for canceling out the photographing device moment, and it is only necessary to generate a moment that enables stable flight or travel of the moving body 20.

Note that as described above, the moment control section 22h may be configured to use the storage section storing the information of the stable propulsive force of the moving body 20 with respect to the zoom position information from the photographing device 10 and acquire the information of the propulsive force corresponding to the inputted zoom position information.

The moment control section 22h judges whether the stable propulsive force can be obtained in the propulsion section 21. The moment control section 22h generates an unavailability response if no possibility of obtaining the stable propulsive force exists and generates an availability response if the stable propulsive force can be obtained. Even when generating the availability response, the moment control section 22h obtains a condition (hereinafter, called a stable alteration condition) necessary for altering the device state of the photographing device while ensuring the stability of the moving body 20. When generating the availability response, the moment control section 22h generates device state alteration control information, such as zoom control information, according to the stable alteration condition for controlling the change in the position of the center of gravity of the photographing device 10. The device state alteration control information is transmitted to the control section 12 of the photographing device 10 through the communication sections 27 and 17 as described above. When the control section 12 as a device state alteration control section receives, for example, the zoom control information as device state alteration control information, the photographing control section 12a is configured to control the zoom position based on the received zoom control information.

The photographing device 10 can be operated by the operation section 13 provided on the photographing device 10, and the photographing remote control apparatus 30 can be used to control photographing. The moving body 20 can autonomously move according to a program recorded in a storage section not shown, and the movement remote control apparatus 40 can be used to control the movement.

As shown in FIG. 2A, the photographing remote control apparatus 30 includes an operation section 31 and a control section 32. The control section 32 can be configured by a processor, such as a CPU, not shown and is configured to control each section of the photographing remote control apparatus 30. The photographing remote control apparatus 30 is provided with a storage section 36, and various information, programs used in the control section 32, and the like can be stored in the storage section 36. The photographing remote control apparatus 30 includes a communication section 33, and the communication section 33 can transmit and receive information to and from the communication section 18 of the photographing device 10. The control section 32 is provided with a communication control section 32a, and the communication control section 32a can transfer information to and from the control section 12 of the photographing device 10 through the communication sections 33 and 18.

The control section 32 can generate an operation signal for operating the photographing device 10 based on a user operation for the operation section 31 and transmit the operation signal to the control section 12 of the photographing device 10 through the communication sections 33 and 18.

The photographing remote control apparatus 30 is also provided with a display section 34, and the communication control section 32a can receive a picked-up image from the photographing device 10 and supply the picked-up image to the display section 34. The display section 34 can display the image photographed by the photographing device 10 on a display screen.

The photographing remote control apparatus 30 may be provided with a communication section 35. The communication section 35 is configured to be able to communicate with a communication section 45 of the movement remote control apparatus 40 described later. The communication control section 32a controls the communication section 35 to enable transferring information between the control section 32 and the control section 42 of the movement remote control apparatus 40. Note that the communication section 35 may not be included if no communication with the movement remote control apparatus 40 is done.

As shown in FIG. 2B, the movement remote control apparatus 40 includes an operation section 41 and a control section 42. The control section 42 can be configured by a processor, such as a CPU, not shown and is configured to control each section of the movement remote control apparatus 40. The movement remote control apparatus 40 is provided with a storage section 46, and various information, programs used in the control section 42, and the like can be stored in the storage section 46. The movement remote control apparatus 40 includes the communication section 43, and the communication section 43 can transmit and receive information to and from the communication section 28 of the moving body 20. The control section 42 is provided with a communication control section 42a, and the communication control section 42a enables transferring information to and from the control section 22 of the moving body 20 through the communication sections 43 and 28.

The control section 42 can generate an operation signal for operating the moving body 20 based on a user operation for the operation section 41 and transmit the operation signal to the control section 22 of the moving body 20 through the communication sections 43 and 28.

The movement remote control apparatus 40 is provided with a display section 44, and the display section 44 can display various menu displays and the like for controlling the moving body 20 on a display screen.

The communication control section 42a can also receive the picked-up image from the moving body 20 and supply the picked-up image to the display section 44. The display section 44 can display the picked-up image from the moving body 20 on the display screen.

The movement remote control apparatus 40 may also be provided with the communication section 45. The communication section 45 is configured to be able to communicate with the communication section 35 of the photographing remote control apparatus 30. The communication control section 42a controls the communication section 45 to enable transferring information between the control section 42 and the control section 32 of the photographing remote control apparatus 30. Note that the communication section 45 may not be included when no communication with the photographing remote control apparatus 30 is done.

Figure 5:
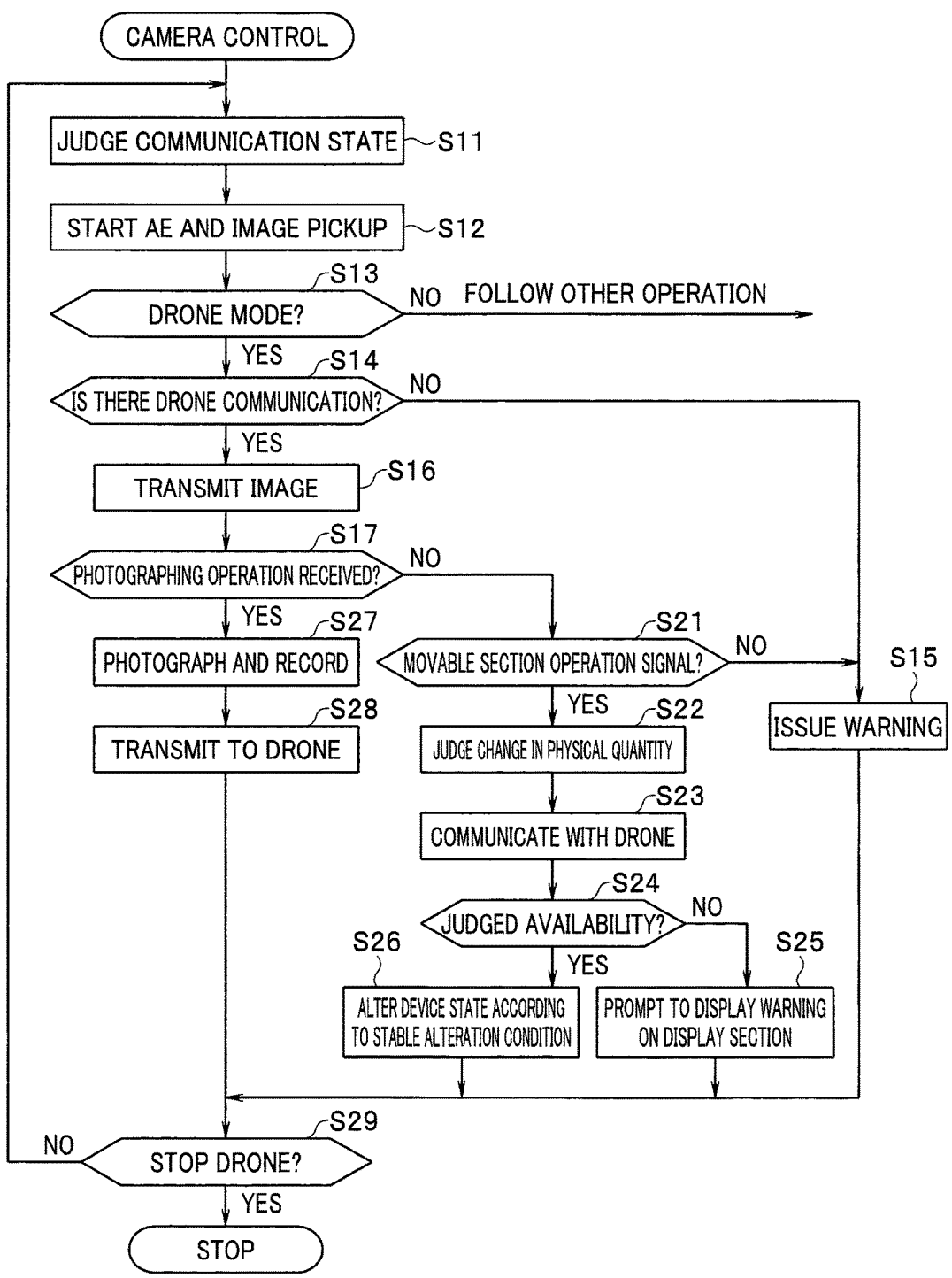
FIG. 5 is a flowchart showing camera control.
Figure 6:
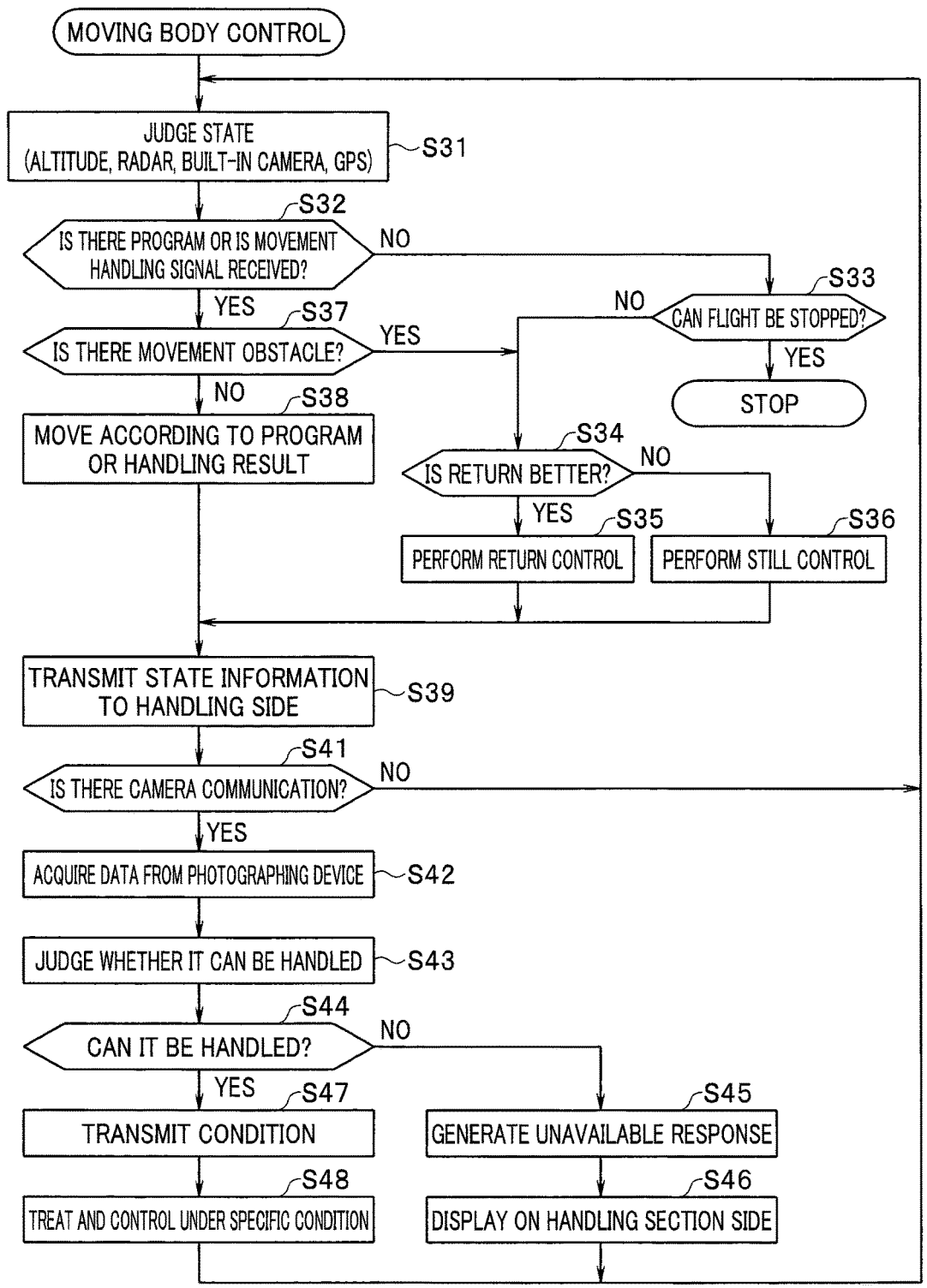
FIG. 6 is a flowchart showing moving body control.
Figure 7A:
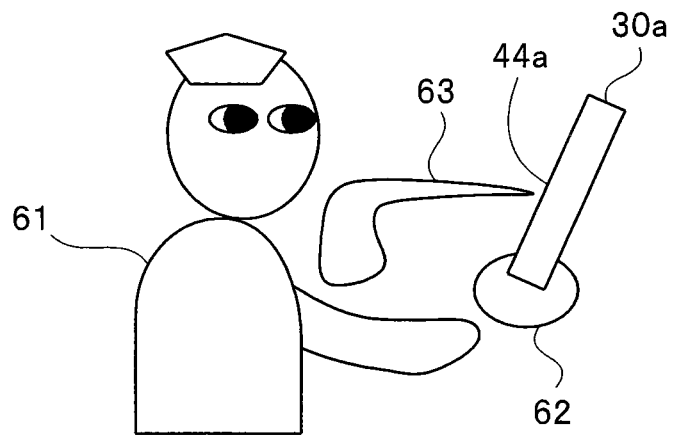
FIG. 7A is an explanatory diagram showing a situation of controlling photographing.
Figure 7B:
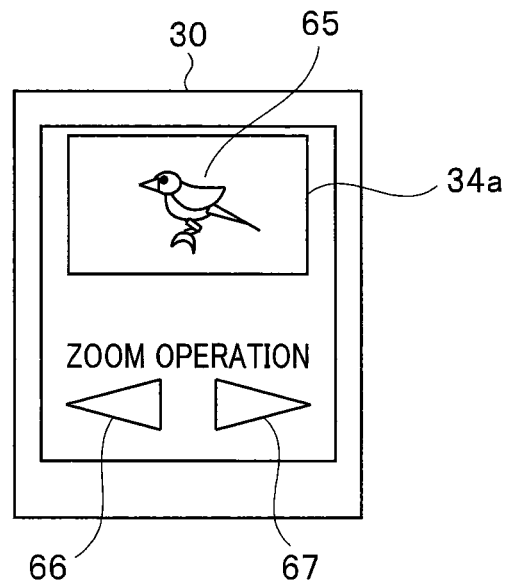
FIG. 7B is an explanatory diagram showing a situation of controlling photographing.
Figure 8A:
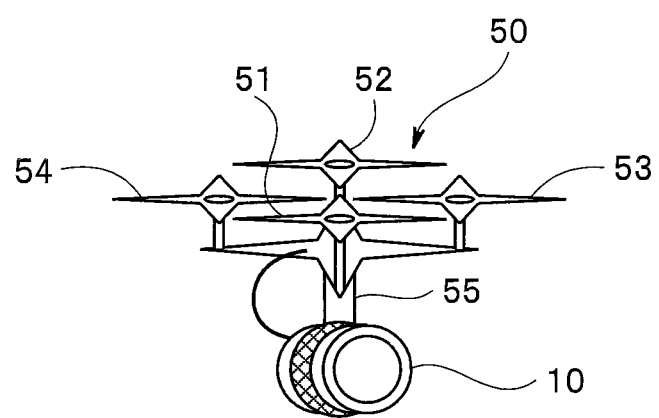
FIG. 8A is an explanatory diagram for describing control of the moving body when the photographing device 10 is zooming.
Figure 8B:
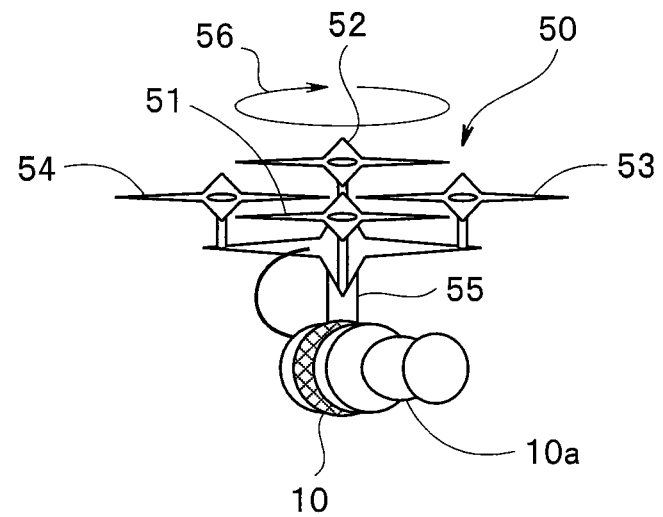
FIG. 8B is an explanatory diagram for describing control of the moving body when the photographing device 10 is zooming.
Figure 9A:
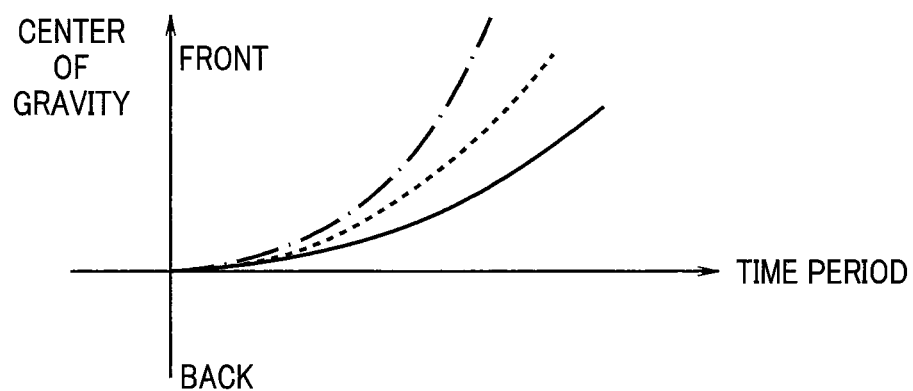
FIG. 9A is an explanatory diagram showing a change in the center of gravity of the photographing device 10.
Figure 9B:
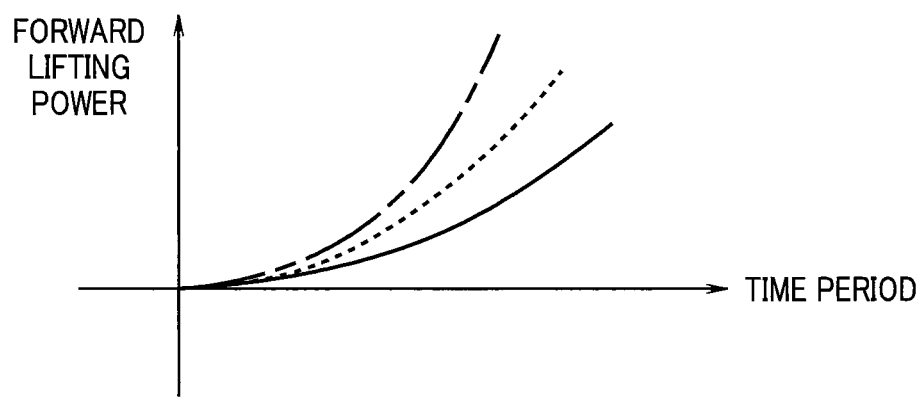
FIG. 9B is an explanatory diagram showing a change in forward lifting power corresponding to the change in the center of gravity of FIG. 8.

Next, operation of the embodiment configured in this way will be described with reference to FIGS. 5 to 9B. FIG. 5 is a flowchart showing camera control, and FIG. 6 is a flowchart showing moving body control. FIGS. 7A and 7B are explanatory diagrams showing a situation of controlling photographing, and FIGS. 8A and 8B are explanatory diagrams for describing control of the moving body when the photographing device 10 is zooming. FIG. 9A is an explanatory diagram showing a change in the center of gravity of the photographing device 10, and FIG. 9B is an explanatory diagram showing a change in forward lifting power corresponding to the change in the center of gravity of FIG. 9A.

An example of adopting a drone 50 shown in FIG. 8A as the moving body 20 of FIG. 1B will be described. The configuration of the drone 50 is the same as in FIG. 1B, and the control of the drone 50 will be described with reference to FIG. 1B. The photographing device 10 is attached to the drone 50 that is the moving body 20 through an attachment member 55. FIG. 8A shows the state. The photographing device 10 is attached to a lower part of the center of the drone 50 that is the moving body 20 through the attachment member 55. The drone 50 includes four propulsion sections 51 to 54 corresponding to the propulsion section 21 of FIG. 1B, and the photographing device 10 is attached such that the optical axis is disposed in a front and back direction of the propulsion sections 51 and 52. Note that the drone 50 can fly not only based on the operation of the movement remote control apparatus 40, but the drone 50 can also autonomously fly based on a program stored in a storage section not shown.

In step S31, the control section 22 of the drone 50 uses an altimeter, a radar, a built-in camera, a GPS, or the like to judge the current state. In step S32, the control section 22 judges whether a navigation program exists or whether a movement handling signal is received. If no navigation program exists, and the movement handling signal is not received, the control section 22 judges whether the flight can be stopped in step S33. The control section 22 determines that the flight can be stopped and stops the drive when, for example, the drone 50 is landed on the ground. If the control section 22 does not judge that the flight can be stopped, the control section 22 judges whether it is better to return in step S34. If the control section 22 judges that it is better to return, the control section 22 performs return control (step S35), and if not, the control section 22 performs hovering control (step S36).

If the control section 22 has a navigation program or a movement handling signal is received, the control section 22 judges whether a movement obstacle exists in step S37. If a movement obstacle exists, the control section 22 shifts the process to step S34, and if no movement obstacle exists, the control section 22 performs the movement according to the navigation program or the movement handling signal (step S38). The control section 22 transmits state information based on the state judgement result acquired in step S31 to the communication section 43 of the movement remote control apparatus 40 through the communication section 28 to allow the movement remote control apparatus 40 to check the flight state (step S39).

The process of steps S31 to S39 in the drone 50 is carried out regardless of whether the photographing device 10 is mounted. When the photographing device 10 is mounted, the drone 50 judges whether camera communication exists in step S41.

On the other hand, the photographing device 10 is operated by the photographing remote control apparatus 30. As shown in FIG. 7A, a photographer 61 uses, for example, a left hand 62 to grasp a housing 30*a* of the photographing remote control apparatus 30 and uses a right hand 63 to perform photographing while viewing a picked-up image (through image) displayed on a display screen 34*a* of the display section 34. FIG. 7B shows display of the display screen 34*a* of the display section 34 of the photographing remote control apparatus 30 in this case. In the example of FIG. 7B, an image 65 of a bird is displayed as a through image on the display screen 34*a*.

The control shown in FIG. 5 is performed in the photographing device 10. In step S11 of FIG. 5, the control section 12 judges whether communication is possible between the communication section 17 and the communication section 27 of the moving body 20. In step S12, the control section 25 performs automatic exposure control (AE) and drives the image pickup section 11 to acquire the picked-up image. In step S13, the control section 12 judges whether the mode is a drone mode for performing photographing by attaching the photographing device 10 to the moving body. If the mode is a mode other than the drone mode, action according to the operation is performed in the mode. If the mode is the drone mode, the control section 12 judges whether drone communication exists in step S14.

Note that in the exposure control of step S12, autofocus control may be performed without affecting the navigation stability of the drone 50.

If communication with the drone 50 is not established, the photographing device 10 displays a warning in step S15. The control section 12 notices a warning to the communication section 33 of the photographing remote control apparatus 30 through the communication section 18. As a result, the control section 32 of the photographing remote control apparatus 30 displays the warning on the display screen 34*a* of the display section 34 in step S15. If communication is not established between the photographing device 10 and the drone 50 so that the cooperative control cannot be performed, the stability of the drone 50 may be threatened by the change in the center of gravity or the change in the shape of the photographing device 10. The control section 12 displays the warning in step S15 of FIG. 5 to notify the user of the risk and does not accept the operation of changing the center of gravity or the shape of the photographing device 10. Note that although the warning is displayed on the display section 34 of the photographing remote control apparatus 30 in the description, the warning may be simultaneously displayed on both a display section (not shown) of the photographing device 10 and the display section 34 of the photographing remote control apparatus 30 if the display section is provided on the photographing device 10.

If communication with the drone 50 is established, the photographing device 10 transmits the picked-up image to the photographing remote control apparatus 30 in step S16 and judges whether a signal for a photographing operation (release operation) is received in step S17. If the control section 12 judges that a release operation is operated, the control section 12 performs photographing in step S27 and records the picked-up image in the recording section 16. The control section 12 also transmits the picked-up image to the drone 50 (step S28). The control section 12 judges whether the drone 50 is stopped in step S29 and returns the process to step S11 if the drone 50 is not stopped.

On the other hand, if the control section 12 judges that the signal for the photographing operation is not received in step S17, the control section 12 judges whether an operation signal involving a change in the center of gravity or a change in the shape, such as zooming operation and stroboscope operation, that is, an operation signal for operating the movable section (hereinafter, called a movable section operation signal), is received by the photographing remote control apparatus 30 in step S21. If the movable section operation signal is received, the control section 12 judges that the changes in the position of the center of gravity and the shape are changes in the physical quantity and acquires the photographing device side moment calculation information before driving and controlling each section based on the movable section operation signal (step S22). The control section 12 transmits the acquired photographing device side moment calculation information to the drone 50 (step S23).

Note that not only the movable section operation signal based on the manual operation from the photographing remote control apparatus 30 is judged in step S21, but generation of all control signals for moving the movable section of the photographing device 10 is judged. For example, generation of a control signal for autofocus generated by the control section in the photographing device 10 is also judged in step S21. The control section 12 is also configured to transmit the photographing device side moment calculation information based on the control signal to the drone 50 before the control based on the control signal.

On the other hand, if the drone 50 detects that camera communication is occurred in step S41, the drone 50 acquires data from the photographing device 10 in step S42 of FIG. 6. The control section 22 gives the photographing device side moment calculation information transmitted from the photographing device 10 to the moment control section 22h. When the moment control section 22h receives the photographing device side moment calculation information from the photographing device 10, the moment control section 22h calculates the photographing device moment based on the center of gravity information of the moving body 20 and the attachment position information of the photographing device 10. The moment control section 22h calculates stable propulsive force necessary for canceling out the photographing device moment. The moment control section 22h judges whether the calculated stable propulsive force can be obtained in the propulsion section 21 (step S43).

If the stable propulsive force cannot be obtained, the moment control section 22h shifts the process from step S44 to step S45 to generate an unavailability response for the photographing device 10 and controls the display section 44 of the movement remote control apparatus 40 to display the response (step S46). If the stable propulsive force can be obtained, the moment control section 22h transmits, to the photographing device 10, an availability response that is the device state alteration control information including information of the stable alteration condition for altering the device state while maintaining the stability of the moving body 20 (step S47) and drives each section according to the stable alteration condition (step S48).

The stable alteration condition also includes information for performing synchronized control between the photographing device 10 and the drone 50. That is, the device state alteration control information transmitted to the photographing device 10 by the moment control section 22h includes, for example, zoom control information regarding how to control the zoom. That is, the zoom control information includes information for prescribing the timing of the control, and the drone 50 performs control to change the propulsive force in the propulsion section 21 according to the zoom control of the photographing device 10.

In step S24, the control section 12 of the photographing device 10 judges whether an unavailability response or an availability response is received from the drone 50. If the unavailability response is received, the control section 12 shifts the process to step S25 to display a warning on the photographing remote control apparatus 30. The control section 32 of the photographing remote control apparatus 30 displays, on the display section 34, a warning indicating that the drone 50 cannot handle the alteration in the device state.

If the control section 12 of the photographing device 10 receives the availability response in step S24, the control section 12 shifts the process to step S26 and alters the device state according to the stable alteration condition included in the device state alteration control information. For example, if the availability response is received in response to the zoom operation, the zoom control information for controlling the change in the position of the center of gravity of the photographing device 10 is given to the control section 12 to obtain the stable propulsive force. The photographing control section 12a is configured to control the zoom position based on the received zoom control information.

Now, it is assumed that the user performs the zoom operation by using zoom buttons 66 and 67 provided on the photographing remote control apparatus 30 shown in FIG. 7B. For example, the zoom button 66 is a button for the control toward the wide-angle side, and the zoom button 67 is a button for the control toward the telephoto side. Now, it is assumed that the user operates the zoom button 67 of the photographing remote control apparatus 30 to perform the zoom operation toward the telephoto side of the photographing device 10 in the stable flight state of the drone 50.

FIG. 8B shows the control of the propulsive force in this case. When the center of gravity moves forward after extension of a lens barrel 10a of the photographing device 10, the drone 50 increases the rotational speed of the front propulsion section 51 as indicated by an arrow 56 to increase the lifting power of the drone 50 forward and upward. This generates the moment for canceling out the photographing device moment caused by the forward movement of the center of gravity of the photographing device 10, and the drone 50 maintains the stable flight regardless of the expansion and contraction of the lens barrel 10a.

FIG. 9A shows changes in the center of gravity of the photographing device 10 during the zoom operation, wherein the horizontal axis represents the time period, and the vertical axis represents the position of the center of gravity. A solid line of FIG. 9A indicates the change in the center of gravity in a general photographing device such as a compact camera. A dashed line indicates the change in the center of gravity in a so-called luxury machine such as a single-lens reflex camera. An alternate long and short dash line indicates the change in the center of gravity of a professional photographing device. In FIG. 9A, a characteristic with an earlier rise indicates that a lens with a heavier weight is adopted or a lens with a high zoom speed that can move to the telephoto end in a shorter time period is adopted.

FIG. 9A shows an example of performing the control such that the change in the zoom magnification in a unit time period becomes constant. In this case, the closer the zoom lens to the telephoto end, the more the amount of movement of the zoom lens needs to be, and the change in the center of gravity per unit time period becomes large.

FIG. 9B shows changes in the forward lifting power (forward upward propulsive power) for obtaining stable flight during the zoom operation of the photographing device 10, wherein the horizontal axis represents the time period, and the vertical axis represents the forward lifting power of the moving body. A solid line, a dashed line, and an alternate long and short dash line of FIG. 9B correspond to the characteristics of the solid line, the dashed line, and the alternate long and short dash line of FIG. 9A, respectively.

As shown in FIGS. 9A and 9B, the forward lifting power needs to be increased at a speed corresponding to the movement speed of the position of the center of gravity of the photographing device associated with the zoom operation in order to maintain the stable flight state of the drone 50 regardless of the zoom operation of the photographing device. An example of a method of facilitating the control includes performing the control by dividing the zoom control into relatively short time periods. For example, in a period in which the user is performing the zoom operation, a change in the physical quantity is set according to a prescribed movement of the center of gravity in step S22, and the change in the physical quantity is transmitted to the drone 50. The drone 50 sets a stable alteration condition corresponding to the prescribed movement of the center of gravity to control the propulsive force according to the condition and transmits the device state alteration control information including the stable alteration condition to the photographing device 10. The control section 12 of the photographing device 10 moves the zoom lens to a zoom position corresponding to the prescribed movement of the center of gravity. The process is repeated in the period in which the user is performing the zoom operation, thereby allowing the zoom desired by the user. If the prescribed movement of the center of gravity is relatively small, the drone 50 can surely obtain the stable propulsive force, and the zoom operation can be performed while the stable flight is maintained.

As shown in FIGS. 9A and 9B, a difference in the change in the center of gravity with respect to the zoom rate is exists between the wide-angle side and the telephoto side. Therefore, for example, the control may be performed by setting a relatively large value for the prescribed movement of the center of gravity on the wide-angle side and setting a relatively small value for the prescribed movement of the center of gravity on the telephoto side.

Note that it is preferable that the propulsive force control for obtaining the stable propulsive force in the drone 50 and the device state alteration control, such as zooming, in the photographing device 10 are associated and synchronized with each other. Therefore, information of the start time of the control is also included in the device state alteration control, and the drone 50 and the photographing device 10 mutually perform synchronized control using the start time information. The associated control may be performed not only by setting the start time of the control, but also by repeating the communication between the photographing device 10 and the drone.

Furthermore, a stable alteration condition considering the prescribed movement of the center of gravity may be set in advance on the moving body 20 side depending on the relationship among the weight of the photographing device 10, the propulsive force of the moving body 20, and the like. In this case, when the user performs zoom operation, only the operation signal is transmitted to the moving body 20, for example. When the moving body 20 receives the zoom operation signal, the moving body 20 sets the stable alteration condition in consideration of the prescribed movement of the center of gravity. The moving body 20 performs propulsive force control according to the condition and transmits the device state alteration control information including the stable alteration condition to the photographing device 10. The photographing device 10 determines the amount of zoom based on the received device state alteration control information and the relationship among the weight of the photographing device 10, the zoom position, and the position of the center of gravity. The control can be repeated to perform zooming in the photographing device 10 while the stable flight of the moving body 20 is maintained. Note that in this case, a plurality of prescribed movements of the center of gravity, such as low speed, medium speed, and high speed, may be considered on the moving body 20 side, and a selection may be made according to the operation of the moving body 20.

When a wide-angle lens is adopted as the optical system 11a of the photographing device 10, the movement of the center of gravity is relatively small even during zooming. Therefore, when the photographing device 10 simultaneously transmits the photographing device side moment calculation information and information indicating the adoption of the wide-angle lens, the moving body may generate, as the stable alteration condition, an availability response for permitting a relatively high-speed zoom movement. In this case, a relatively large movement of the center of gravity may be set as the prescribed movement of the center of gravity. Conversely, a professional lens is heavy, and a relatively small value may be designed for the prescribed movement of the center of gravity.

In the moving body 20, such as a drone, the vibration during the flight is relatively large in some cases. Therefore, when the photographing device 10 determines that the shake in the picked-up image is relatively large, the photographing device 10 may generate information related to the shake and transmit the information to the moving body 20. The moving body 20 may perform the hovering control during the shake.

In addition, the moving body 20, such as a drone, tends to be affected by wind pressure. Therefore, when the wind pressure is equal to or greater than a predetermined value in the moving body 20, the motion of the movable section may be prohibited in the photographing device 10. The moving body 20, such as a drone, may also set a limitation of admitting the motion of the movable section of the photographing device 10 only during hovering, for example.

In this way, when a motion of the movable section is occurred that affects the stability of the moving body in the photographing device mounted on the moving body in the present embodiment, a change in the physical quantity that affects the stability of the moving body associated with the motion of the movable section is obtained prior to the motion and transmitted to the moving body. The moving body obtains a stable alteration condition corresponding to the change in the physical quantity, and the propulsive force of the moving body is controlled according to the stable alteration condition. The moving body transmits device state alteration control information including the stable alteration condition to the photographing device, and the photographing device controls the motion of the movable section based on the device state alteration control information. As a result, the stability in the moving body and the stability of photographing can be maintained.

That is, a photographing control apparatus for moving body can be provided, the apparatus including: a first control section configured to obtain a change in physical quantity related to a photographing device attached to a moving body based on photographing state alteration operation of the photographing device; and a second control section configured to predict and obtain a moment to be generated in the moving body based on the change in the physical quantity and generate information based on the obtained moment. The moving body may judge whether the change in the moment can be accepted based on the moment information. The moving body may reject the change in the moment in the photographing device or may advise the photographing device for other photographing control. The moving body can make a determination for prioritizing photographing while setting some restrictions on the movement. In any case, disturbance of the movement of the moving body due to various changes in the physical quantity without any information needs to be prevented, and sharing the information in advance is important. The photographing device with such specifications allows safe attachment and movement.

Second Embodiment

Figure 10:
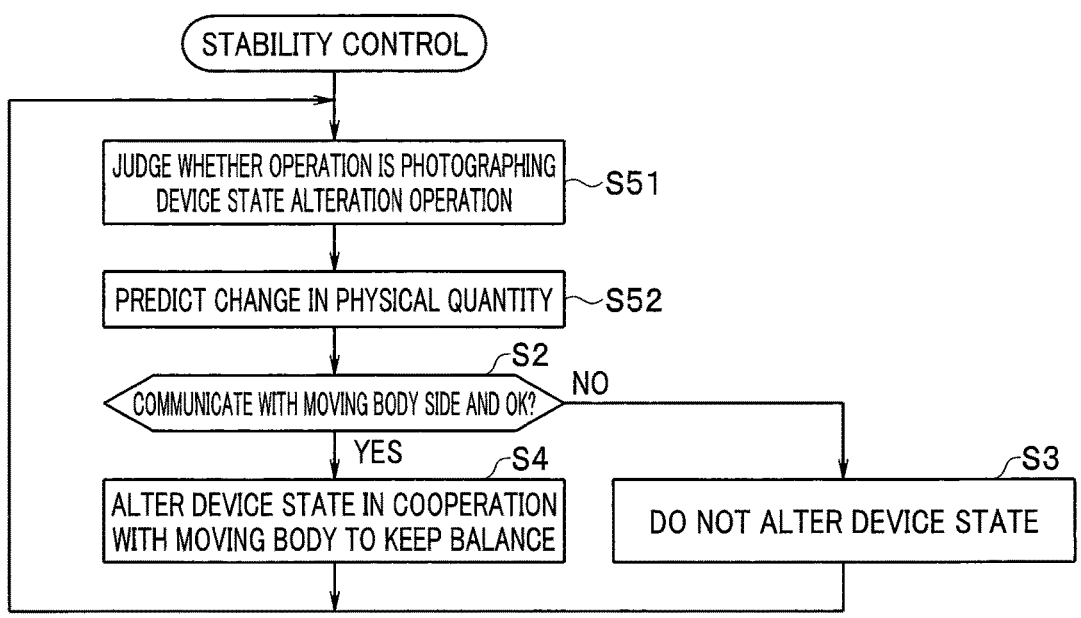
FIG. 10 is a flowchart adopted in a second embodiment of the present invention.

FIG. 10 is a flowchart adopted in a second embodiment of the present invention. In FIG. 10, the same procedures as in FIG. 3 are provided with the same reference signs, and the description will not be repeated. The hardware configuration in the present embodiment is the same as in the first embodiment. The present embodiment illustrates an example in which a photographing remote control apparatus configured to remotely control the photographing device executes the stability control by the photographing control apparatus for moving body. FIG. 10 shows the stability control by the photographing remote control apparatus.

In step S51, the photographing remote control apparatus judges whether the operation of the operation section by the user is an operation for moving the movable section of the photographing device, that is, a photographing state alteration operation. If the user operation is the photographing state alteration operation, the photographing remote control apparatus predicts the change in the physical quantity based on the alteration in the device state before transmitting an operation signal for altering the device state to the photographing device (step S52).

While the stability control is executed by the communication between the moving body and the photographing device in steps S2 to S4 of FIG. 3, steps S2 to S4 in FIG. 10 are different in that the moving body and the photographing remote control apparatus communicate with each other to control the stability. That is, the change in the physical quantity is transmitted from the photographing remote control apparatus to the moving body, and the photographing remote control apparatus also receives, from the moving body, an answer for whether the change in the physical quantity can be allowed. In step S4, the photographing remote control apparatus alters the device state in cooperation with the moving body. The photographing remote control apparatus follows the condition designated by the moving body and controls the photographing device by generating an operation signal for altering the device state that changes the physical quantity.

Note that respective processes of respective steps S51, S52, and S2 to S4 of FIG. 10 are enabled by, for example, storing information for the processes in a storage section provided in the photographing remote control apparatus.

In this way, the photographing remote control apparatus configured to remotely control the photographing device and the moving body provided with the photographing device perform the cooperative control in the present embodiment to ensure the stability of the moving body even when the state of the photographing device is altered. The state of the photographing device can be altered while the stability of the moving body is maintained, and the stability of photographing is ensured even when the state of the photographing device is altered.

Note that although the stability control by the photographing control apparatus for moving body is executed by the cooperative control through the communication between the photographing remote control apparatus and the moving body in the example illustrated in the present embodiment, it is apparent that the same stability control can be executed by cooperative control through communication between the photographing device and the movement remote control apparatus.

Third Embodiment

Figure 11:
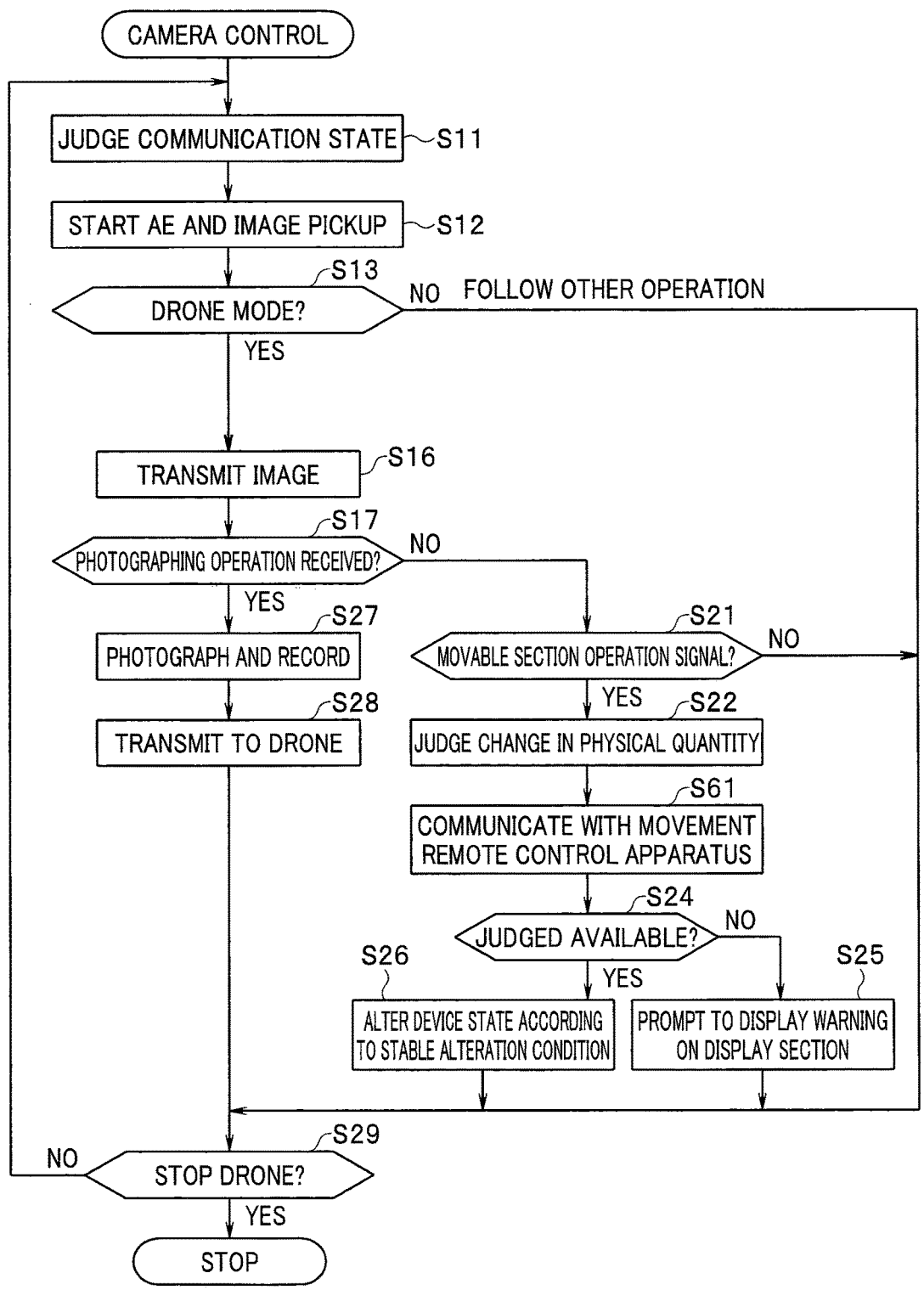
FIG. 11 is an explanatory diagram showing camera control by the photographing remote control apparatus.
Figure 12:
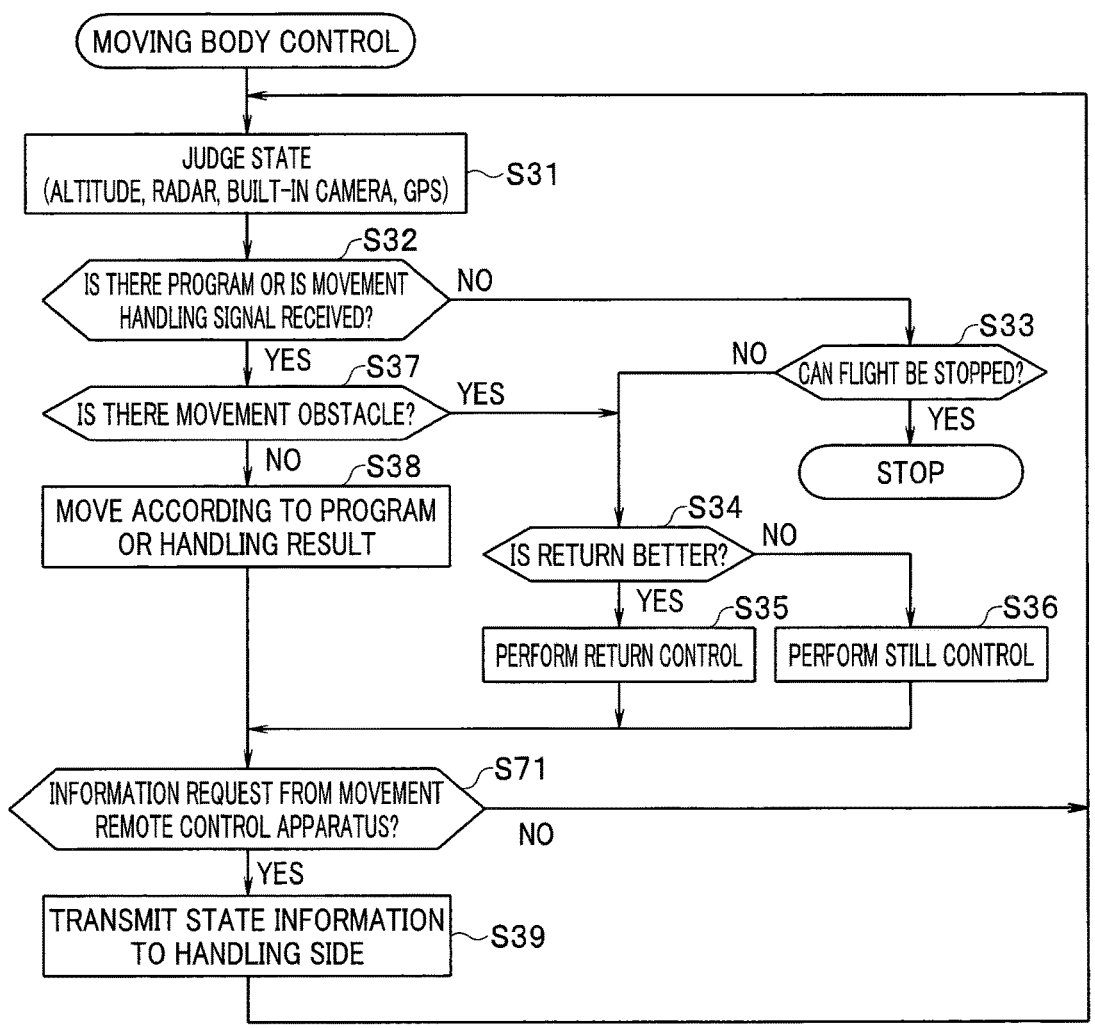
FIG. 12 is an explanatory diagram showing moving body control by the moving body.
Figure 13:
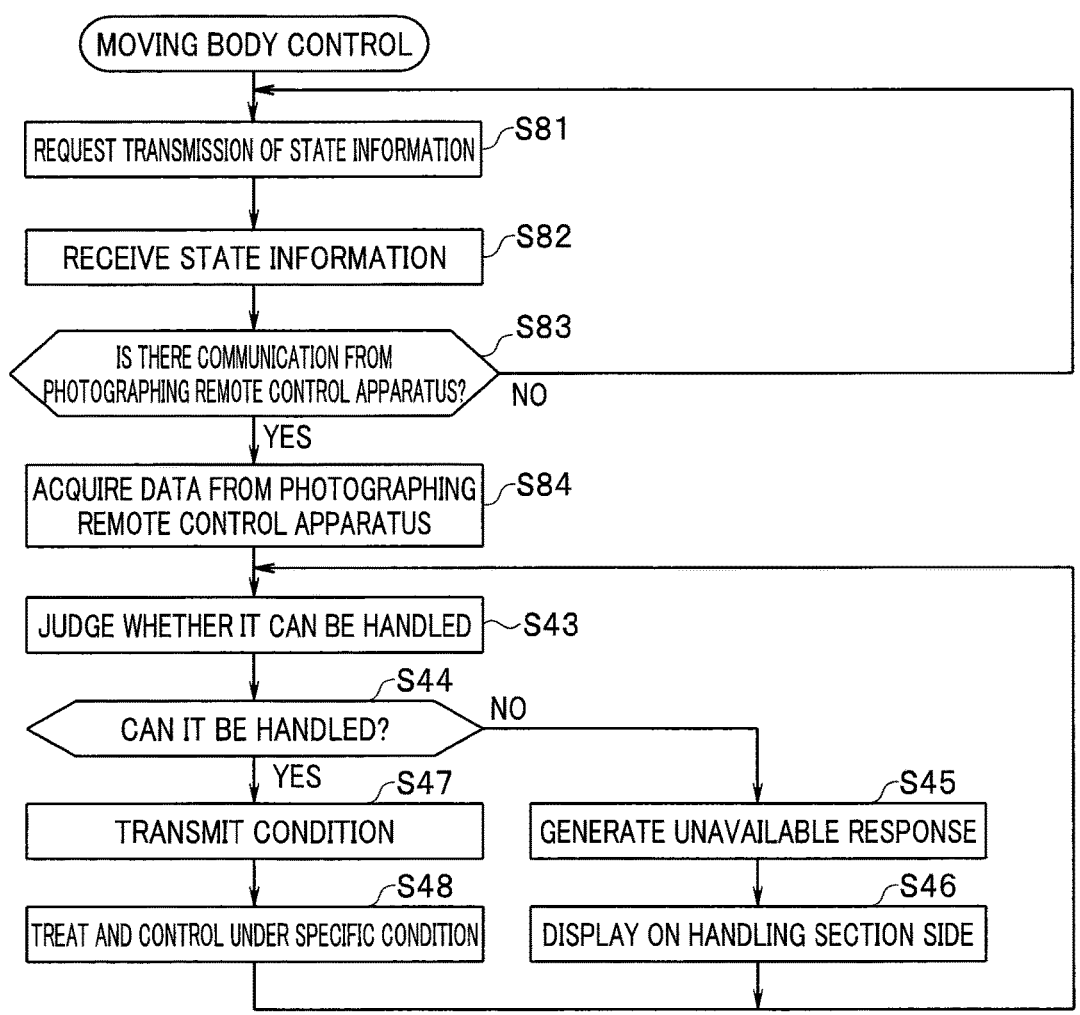
FIG. 13 is an explanatory diagram showing moving body control by the movement remote control apparatus.

FIGS. 11 to 13 are flowcharts for describing control adopted in a third embodiment of the present invention. FIG. 11 shows camera control by the photographing remote control apparatus. FIG. 12 shows moving body control by the moving body. FIG. 13 shows moving body control by the movement remote control apparatus. In FIGS. 11 to 13, the same procedures as in FIGS. 5 and 6 are provided with the same reference signs, and the description will not be repeated. The hardware configuration of the present embodiment is the same as in the first embodiment.

The present embodiment illustrates another example of the photographing control apparatus for moving body, wherein the stability control is realized by cooperative control through communication between the photographing remote control apparatus configured to remotely operate the photographing device and the movement remote control apparatus configured to remotely operate the moving body.

To increase the quality of an image obtained by photographing, control of the zoom, the exposure, the focus, and the like tends to be complicated, and concentrating on handling the moving body becomes difficult. Therefore, the present embodiment shows an example in which different persons separately operate the moving body, such as a drone, and the photographing device.

Figure 14A:
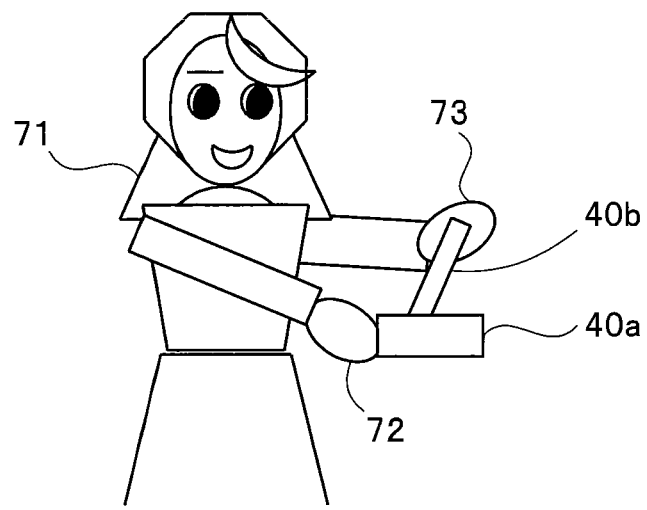
FIG. 14A is an explanatory diagram showing a situation of controlling the moving body.
Figure 14B:
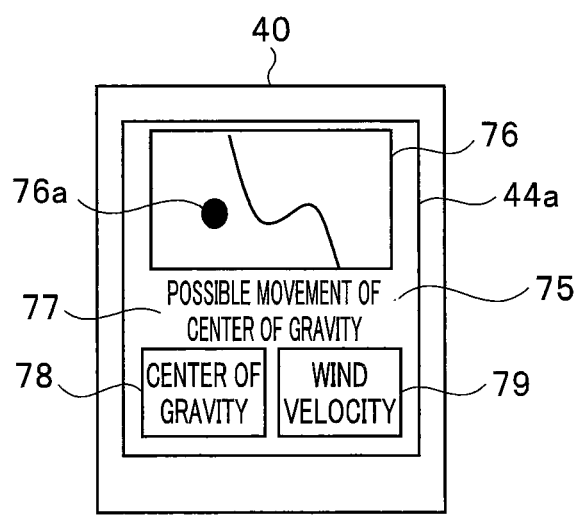
FIG. 14B is an explanatory diagram showing a situation of controlling the moving body.

FIGS. 14A and 14B are explanatory diagrams showing a situation of controlling the moving body. As shown in FIG. 14A, an operator 71 uses, for example, a right hand 72 to grasp a housing 40a of the movement remote control apparatus 40 and uses a left hand 73 to operate an operation lever 40b for operating the moving body 20. Note that as shown in FIG. 7A, it is assumed that the photographer 61 operates the photographing remote control apparatus 30 to control photographing by the photographing device 10.

FIG. 14B shows an operation screen 75 displayed on a display screen 44a of the display section 44 of the movement remote control apparatus 40. In the example of FIG. 14B, a map display 76 indicating the position of the drone 50 is displayed in the operation screen 75. A map is displayed in the map display 76, and a point display 76a indicates the position of the drone 50. A message display region 77 is provided in the operation screen 75, and messages according to operation of message display buttons 78 and 79 are displayed in the message display region 77. The message display button 78 is a button for displaying a message of whether to transmit an availability response or to transmit an unavailability response for the movement of the center of gravity of the photographing device 10. In the example of FIG. 14B, the display of "possible movement of center of gravity" indicates that the availability response is to be transmitted. The message display button 79 is a button for displaying a display indicating the wind velocity in the message display region 77.

The camera control of FIG. 11 is different from the camera control of FIG. 5 in that the execution subject of each process is the photographing remote control apparatus 30 (particularly, the control section 32) instead of the photographing device 10 (particularly, the control section 12). In the present embodiment, the photographing remote control apparatus 30 and the movement remote control apparatus 40 communicate with each other for cooperative control, and the judgement process of the drone communication in step S14 of FIG. 5 is not included in FIG. 11. The flow of FIG. 11 is provided with step S61 for communication with the movement remote control apparatus 40, in place of step S23 of FIG. 5.

The flow of FIG. 12 shows control by the moving body 20, and steps S31 to S39 of the flow of FIG. 6 are adopted. Note that although state information is transmitted in response to an information request from the movement remote control apparatus 40 in step S71 of FIG. 12, the state information may be transmitted to the movement remote control apparatus 40 regardless of the information request.

FIG. 13 shows control by the movement remote control apparatus. Steps S43 to S48 in the flow of FIG. 6 are adopted in the flow of FIG. 13. The moving body control of FIG. 13 is different from the moving body control of FIG. 6 in that the execution subject of each process is the movement remote control apparatus 40 (particularly, the control section 42) instead of the moving body 20 (particularly, the control section 22).

The control section 42 of the movement remote control apparatus 40 requests the moving body 20 to transmit the state information in step S81 and receives the state information in step S82. In step S83, the control section 42 judges whether communication from the photographing remote control apparatus 30 is done. When the result of the judgement of the change in the physical quantity is transmitted from the photographing remote control apparatus 30 in step S61 of FIG. 11, the control section 42 receives the transmission data.

The state information from the moving body 20 and the information related to the change in the physical quantity from the photographing remote control apparatus 30 are given to the control section 42, and the control section 42 obtains the stable alteration condition in the moving body 20. Note that the control section 42 may take the information of the wind power into account in calculating the stable alteration condition. If the control section 42 judges that the change in the physical quantity due to the control of the movable section of the photographing device 10 by the photographing remote control apparatus 30 cannot maintain the stability of the moving body 20, the control section 42 shifts the process to step S45. The control section 42 generates an unavailability response and displays the unavailability response on the display section 44.

When the control section 42 generates an availability response, the control section 42 transmits, to the moving body 20, the operation signal for controlling the propulsive force of the moving body 20 according to the stable alteration condition and transmits, to the photographing remote control apparatus 30, the device state alteration control information including the stable alteration condition. The control section 32 of the photographing remote control apparatus 30 controls the movable section of the photographing device 10 while satisfying the stable alteration condition.

In this way, the stability of the moving body and the stability of photographing can also be maintained in the present embodiment when an operation of moving the movable section of the photographing device is performed. Note that the communication distance between the photographing device and the photographing remote control apparatus is shorter than the communication distance between the moving body and the movement remote control apparatus in some cases. Even in such a case, the photographing remote control apparatus and the movement remote control apparatus communicate with each other to perform cooperative control for maintaining the stability in the present embodiment, and the control can be surely performed even when the distance between the photographing remote control apparatus and the moving body is relatively long. All or part of the remote control apparatus and the movement remote control apparatus can be configured by a smartphone in some cases. The degree of freedom of display is relatively high in the smartphone. Therefore, the present embodiment has an advantage that a user-friendly GUI can be provided when a user operation is necessary for controlling the stability.

Fourth Embodiment

Figure 15:
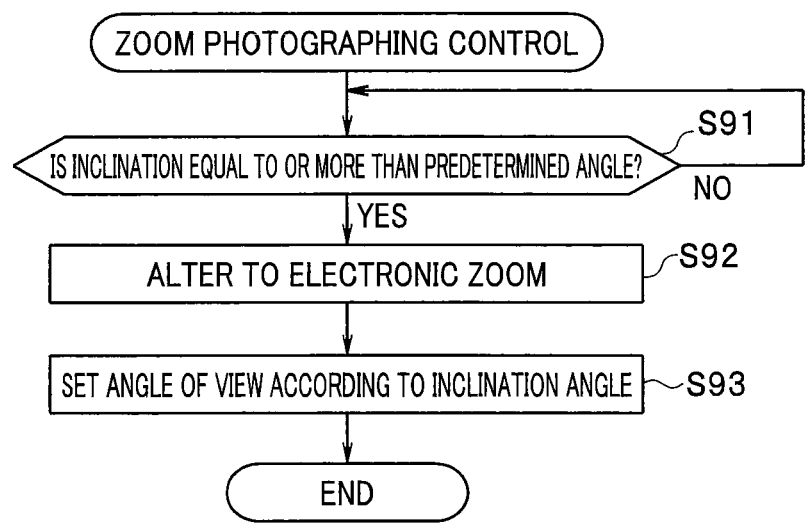
FIG. 15 is a flowchart for describing control adopted in a fourth embodiment.

FIGS. 15, 16, and 17A to 17C relate to a fourth embodiment of the present invention. FIG. 15 is a flowchart for describing control adopted in the fourth embodiment, and FIGS. 16 and 17A to 17C are explanatory diagrams for describing the fourth embodiment. The hardware configuration of the present embodiment is the same as in the first embodiment.

Even when the availability response is generated for the change in the physical quantity, such as the movement of the center of gravity, of the photographing device 10, the moving body 20 may be tilted to some extent in some cases due to the movement of the center of gravity or the like of the photographing device 10. The present embodiment improves the stability of photographing even in this case.

The flow of FIG. 15 shows a zoom photographing control flow executed in step S26 of FIG. 5 or 11. For example, assuming that the process of step S26 is executed by the control section 12 of the photographing device 10, the control section 12 judges in step S91 of FIG. 15 whether the moving body 20 is inclined equal to or more than a predetermined angle due to the movement of the center of gravity or the like of the photographing device 10. The control sections 12 and 32 acquire the information related to the moving body 20 in step S23 of FIG. 5 or step S61 of FIG. 11, and the information also includes information related to the inclination angle of the moving body 20. The control section 12 uses the information related to the inclination angle of the moving body 20 acquired in step S23 to judge whether the inclination angle of the moving body 20 is changed equal to or more than the predetermined angle.

Figure 16:
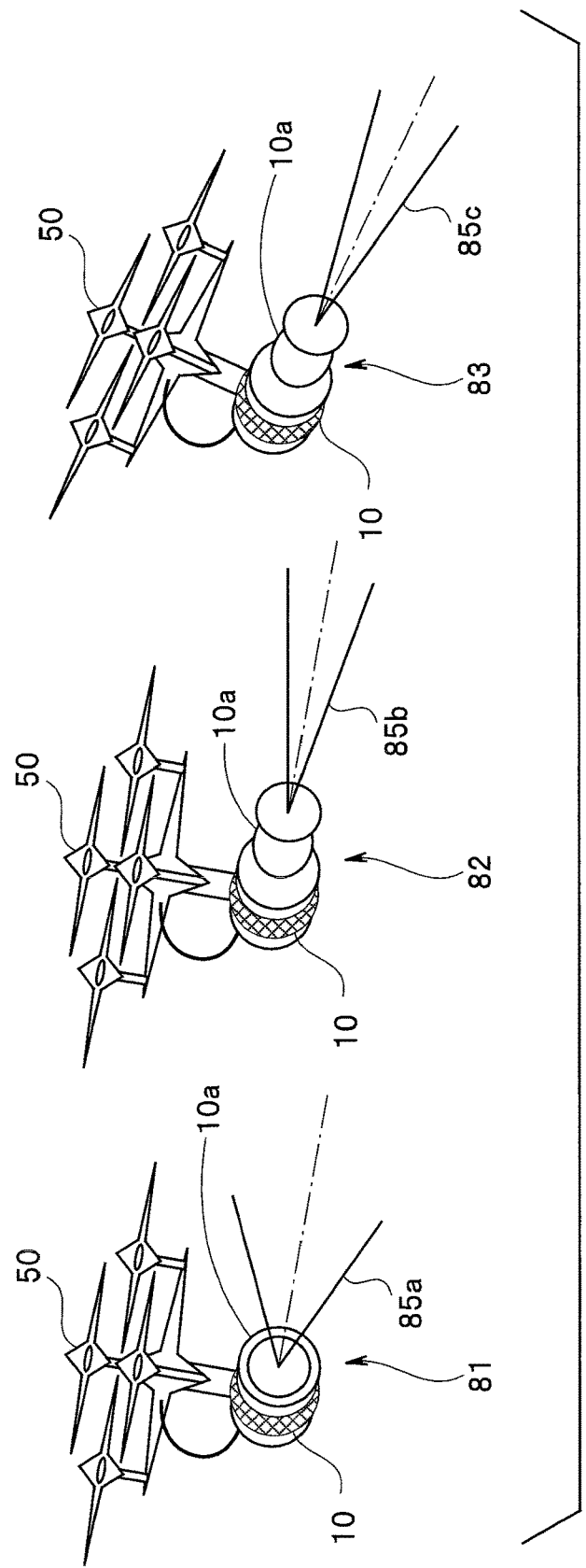
FIG. 16 is an explanatory diagram for describing the fourth embodiment.

FIG. 16 describes the inclination of the drone 50 provided with the photographing device 10. A wide-angle state 81 indicates a state in which the lens barrel 10a is extremely contracted, and an angle of view 85a is in a widest state. An intermediate state 82 is a state in which the lens barrel 10a is extended a little, and an angle of view 85b is in an intermediate state. A telephoto state 83 is a state in which the lens barrel 10a is extremely extended, and an angle of view 85c is in a narrowest state. In the respective states 81 to 83, the inclination angle of the drone 50 varies as indicated by alternate long and short dash lines. The inclination angle of the state 81 is the smallest. The inclination angle of the state 82 is larger, and the inclination angle of the state 83 is the largest.

Figure 17A:
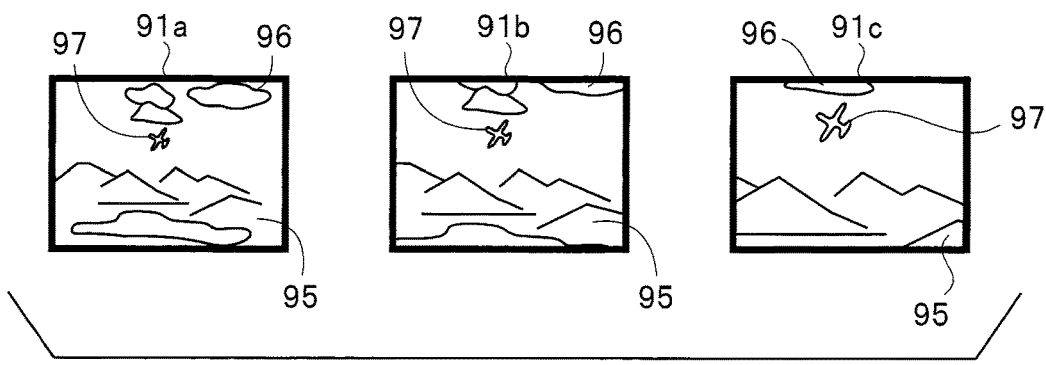
FIG. 17A is an explanatory diagram for describing the fourth embodiment.
Figure 17B:
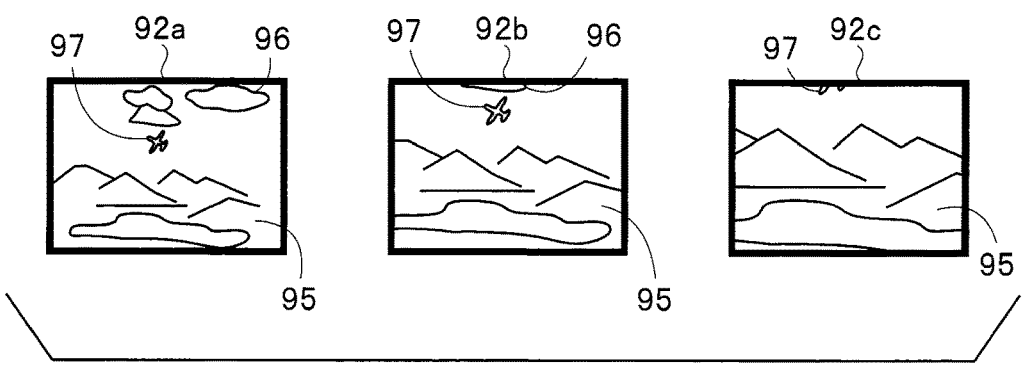
FIG. 17B is an explanatory diagram for describing the fourth embodiment.
Figure 17C:
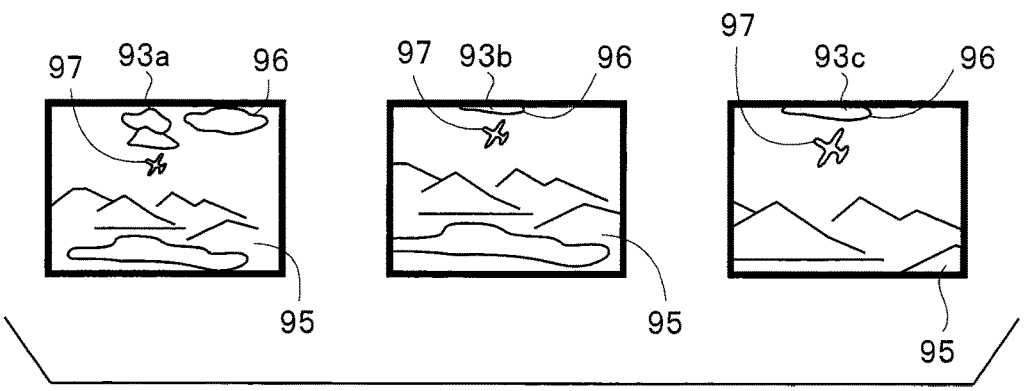
FIG. 17C is an explanatory diagram for describing the fourth embodiment.

FIGS. 17A to 17C show picked-up images in substantially the same field of view direction picked up by the photographing device 10. FIG. 17A shows a picked-up image when the photographing device 10 is fixed on the ground. FIGS. 17B and 17C show picked-up images when the photographing device 10 is attached to the drone 50.

Now, it is assumed, for example, that picked-up images 91a to 91c shown in FIG. 17A are picked up in the wide-angle state, the intermediate state, and the telephoto state when the photographing device 10 is fixed on the ground. The picked-up images 91a to 91c include an image of ground 95, an image of cloud 96 floating in the sky, and an image of an airplane 97 flying in the sky.

FIG. 17B shows picked-up images 92a to 92c when the same photographing direction as in FIG. 17A is photographed by the photographing device 10 attached to the drone 50. The picked-up images 92a to 92c are photographed in the wide-angle state 81, the intermediate state 82, and the telephoto state 83 of FIG. 16, respectively. The image 92b is an image of part of the image 92a, and the image 92c is an image of part of the image 92b. When the images are picked up on the telephoto side, the lens barrel 10a of the photographing device 10 extends forward, and the position of the center of gravity moves forward. As a result of the movement, the drone 50 is in a state extremely inclined forward and downward as indicated by the telephoto state 83. As a result of the inclination, the image 92c is an image expanding the lower part of the image 92b, and most of the airplane 97 sticks out from the photographing range.

Therefore, when the control section 12 detects that the inclination of the drone 50 is changed equal to or more than the predetermined angle in step S91 in the present embodiment, the control section 12 switches the optical zoom to the electronic zoom in step S92. The control section 12 then sets the angle of view according to the inclination angle of the drone 50 in step S93. For example, when the front of the drone 50 is inclined downward, the image of the upper part is cut by the electronic zoom for an angle of view equivalent to the inclination angle.

FIG. 17C shows picked-up images 93a to 93c in the wide-angle state 81, the intermediate state 82, and the telephoto state 83 in this case. The images 93a and 93b are the same images as the images 92a and 92b, respectively. The image 93c picked up on the telephoto side is obtained by cutting a range of the upper part by the electronic zoom, equivalent to the angle of view corresponding to the inclination angle of the drone 50. As a result, the airplane 97 is surely photographed in the image 93c as in the case in which the photographing device 10 is fixed on the ground to pick up an image.

In this way, even when the moving body is inclined, the zoom is switched to the electronic zoom on the telephoto side to cut the range corresponding to the inclination angle if the inclination angle is equal to or more than the predetermined range in the present embodiment. Stable photographing is possible regardless of the inclination of the moving body.

Although a digital camera is used to describe the device for photographing in each of the embodiments, the camera may be a digital single-lens reflex camera or a compact digital camera. The camera may be a camera for movie, such as a video camera and a movie camera, or may obviously be a camera built in a personal digital assist (PDA), such as a mobile phone and a smartphone. All devices that keep balance to move can be applied to the parts written as "drone". The moving bodies may be not only the moving bodies that fly, such as an airplane and a helicopter, but also underwater or aquatic mobile devices, such as a ship, a boat, and a submarine, and the moving bodies may be also moving bodies on the ground in which the balance is important, as is apparent from a bicycle. The concept of the present application can be widely applied to robots and the like, and the present application may be restated as an invention in such a field. In these devices, it is troublesome when the photographing section loses balance after an unexpected change in the center of gravity or the shape, and it is better to switch the control in advance based on the information. Although the imaging is prioritized in some cases even if the balance is somewhat lost, making a judgement in advance on what will happen is important even in that case. Note that the "photographing" here is a concept including not only photographing and recording of still images and photographing and recording of movies, but also including observation and inspection after simply picking up images as well as various measurements based on obtained signals. It is obvious that the moving body and the photographing device are concepts including handling sections for handling the moving body and the photographing device.

The present invention is not limited to the respective embodiments, and in an execution phase, the constituent elements can be modified and embodied without departing from the scope of the present invention. A plurality of constituent elements disclosed in the respective embodiments can be appropriately combined to form various inventions. For example, some of the constituent elements illustrated in the embodiments may be deleted. Constituent elements across different embodiments may also be appropriately combined.

Note that even if "first", "next", and the like are used for the convenience in the description of the operation flows in the claims, the specification, and the drawings, this does not mean that the operation flows need to be carried out in the order. It is obvious that each step configuring the operation flows can be appropriately skipped if the part does not affect the essence of the invention.

Note that among the techniques described here, the control mainly described in the flowcharts can be often set by a program, and the program may be stored in a recording medium or a recording section. The program may be recorded in the recording medium or the recording section at the product shipment, or a distributed recording medium may be used. The program may be downloaded through the Internet.

What is claimed is:

1. A photographing device attachable to a moving body, having a propulsive mechanism for moving the moving body, the photographing device comprising:
   a camera with a movable component; and
   one or more processors comprising hardware, wherein the one or more processors are configured to:
   predict a change in a physical quantity of the photographing device which changes a movement and a posture of the moving body based on a movement to be made by the movable component;
   determine whether the propulsive mechanism can be controlled to maintain a predetermined stability of the moving body caused by the predicted change in the physical quantity of the photographing device;
   in response to determining that the propulsive mechanism can be controlled to maintain the predetermined stability of the moving body caused by the predicted change in the physical quantity of the photographing device:
   determine a control instruction for the propulsive mechanism to move the moving body to reduce the change in the movement and the posture of the moving body caused by the predicted change in the physical quantity of the photographing device; and
   control the propulsive mechanism based on the control instruction together with the movement of the movable component; and
   in response to determining that the propulsive mechanism cannot be controlled to maintain the predetermined stability of the moving body caused by the predicted change in the physical quantity of the photographing device, control the camera to prevent the movement to be made by the movable component.

2. The photographing device according to claim 1, wherein the one or more processors are configured to refer to a storage storing information describing a relationship between the movement to be made and the change in the physical quantity to predict the change in the physical quantity.

3. The photographing device according to claim 2, wherein the storage is arranged with the camera.

4. The photographing device according to claim 1, wherein the movable component of the camera comprises is a lens or a stroboscope.

5. The photographing device according to claim 1, wherein the one or more processors are configured to:
receive information related to an inclination of the moving body;
determine whether the inclination of the moving body exceeds a predetermined threshold; and
in response to determining that the inclination of the moving body exceeds the predetermined threshold, control the camera to set a zoom operation of the camera to electronic zoom.

6. A system comprising:
a moving body comprising a propulsive mechanism configured to move the moving body;
a photographing device attachable to the moving body, the photographing device comprising a camera with a movable component;
one or more processors configured to:
predict a change in a physical quantity of the photographing device which changes a movement and a posture of the moving body based on a movement to be made by the movable component;
determine whether the propulsive mechanism can be controlled to maintain a predetermined stability of the moving body caused by the predicted change in the physical quantity of the photographing device;
in response to determining that the propulsive mechanism can be controlled to maintain the predetermined stability of the moving body caused by the predicted change in the physical quantity of the photographing device:
determine a control instruction for the propulsive mechanism to move the moving body to reduce the change in the movement and the posture of the moving body caused by the predicted change in the physical quantity of the photographing device; and
control the propulsive mechanism based on the control instruction together with the movement of the movable component; and
in response to determining that the propulsive mechanism cannot be controlled to maintain the predetermined stability of the moving body caused by the predicted change in the physical quantity of the photographing device, control the camera to prevent the movement to be made by the movable component.

7. A method for controlling a moving body having a propulsive mechanism for moving the moving body and a photographing device attachable to the moving body, the photographing device having a camera with a movable component, the method comprising:
predicting a change in a physical quantity of the photographing device which changes a movement and a posture of the moving body based on a movement to be made by the movable component;
determining whether the propulsive mechanism can be controlled to maintain a predetermined stability of the moving body caused by the predicted change in the physical quantity of the photographing device;
in response to determining that the propulsive mechanism can be controlled to maintain the predetermined stability of the moving body caused by the predicted change in the physical quantity of the photographing device:
determining a control instruction for the propulsive mechanism to move the moving body to reduce the change in the movement and the posture of the moving body caused by the predicted change in the physical quantity of the photographing device; and
controlling the propulsive mechanism based on the control instruction together with the movement of the movable component; and
in response to determining that the propulsive mechanism cannot be controlled to maintain the predetermined stability of the moving body caused by the predicted change in the physical quantity of the photographing device, controlling the camera to prevent the movement to be made by the movable component.

* * * * *

UNITED STATES PATENT AND TRADEMARK OFFICE
CERTIFICATE OF CORRECTION

| | |
|---|---|
| PATENT NO. | : 10,356,294 B2 |
| APPLICATION NO. | : 15/457268 |
| DATED | : July 16, 2019 |
| INVENTOR(S) | : Yoji Osanai et al. |

It is certified that error appears in the above-identified patent and that said Letters Patent is hereby corrected as shown below:

Column 24, Claim 4, Line 67 should read:
a lens or a stroboscope.

Signed and Sealed this
Twenty-first Day of January, 2020

Andrei Iancu
*Director of the United States Patent and Trademark Office*